US012734704B2

(12) United States Patent
Peng et al.

(10) Patent No.: US 12,734,704 B2
(45) Date of Patent: Sep. 15, 2026

(54) PALLET RECYCLING METHOD, ELECTRONIC DEVICE AND STORAGE MEDIUM

(71) Applicants: ZHEJIANG HENGYI PETROCHEMICAL CO., LTD., Zhejiang (CN); Hangzhou Yitong New Material Co., Ltd., Hangzhou City (CN)

(72) Inventors: Xiantao Peng, Zhejiang (CN); Peng Wang, Zhejiang (CN); Yibo Qiu, Zhejiang (CN); Dake Li, Zhejiang (CN); Mingyi Liu, Zhejiang (CN); Feng Xu, Zhejiang (CN); Xuan Wu, Zhejiang (CN)

(73) Assignees: Zhejiang Hengyi Petrochemical Co., Ltd., Zhejiang (CN); Hangzhou Yitong New Material Co., Ltd., Hangzhou City (CN)

( * ) Notice: Subject to any disclaimer, the term of this patent is extended or adjusted under 35 U.S.C. 154(b) by 30 days.

(21) Appl. No.: 18/958,902

(22) Filed: Nov. 25, 2024

(65) Prior Publication Data

US 2025/0214257 A1 Jul. 3, 2025

(30) Foreign Application Priority Data

Dec. 29, 2023 (CN) ......................... 202311863182.0

(51) Int. Cl.
*B25J 11/00* (2006.01)
*B25J 9/16* (2006.01)
*B25J 15/00* (2006.01)

(52) U.S. Cl.
CPC ............. *B25J 11/005* (2013.01); *B25J 9/161* (2013.01); *B25J 9/1697* (2013.01); *B25J 15/0052* (2013.01)

(58) Field of Classification Search
CPC ........ B25J 11/005; B25J 9/161; B25J 9/1697; B25J 15/0052; G05B 19/41875;
(Continued)

(56) References Cited

U.S. PATENT DOCUMENTS 5,359,408 A * 10/1994 Inada .................. B65H 63/006 356/238.2
12,384,650 B2 * 8/2025 Kurtz ..................... B65H 67/02
(Continued)

FOREIGN PATENT DOCUMENTS

CN 110171745 A 8/2019
CN 111086693 A 5/2020
(Continued)

OTHER PUBLICATIONS

Extended European Search Report issued Mar. 14, 2025 in connection with European Patent Application No. 24215948.1.
(Continued)

*Primary Examiner* — Jason Holloway
*Assistant Examiner* — Madison B Emmett
(74) *Attorney, Agent, or Firm* — Blank Rome

(57) ABSTRACT

Provided is a pallet recycling method, an electronic device and a storage medium. The method includes: after a robot grabs M yarn spindles to be packaged from a yarn spindle trolley through N grippers, controlling the image acquisition device to shoot towards the N grippers to obtain a grabbing result representation image; and after the robot places the M yarn spindles to be packaged one by one on M yarn spindle pallets comprised in a target pallet group arranged on a main line of an assembly line, and when determining that there is a pallet to be recycled in the target pallet group based on the grabbing result representation image, controlling the pallet diversion device to divert the pallet to be recycled from the main line of the assembly line to a branch line of the
(Continued)

After a robot grabs M yarn spindles to be packaged from a yarn spindle trolley through N grippers, controlling an image acquisition device to shoot towards the N grippers to obtain a grabbing result representation image — S101

↓

After the robot places the M yarn spindles to be packaged one by one on M yarn spindle pallets included in a target pallet group arranged on a main line of an assembly line, and when determining that there is a pallet to be recycled in the target pallet group based on the grabbing result representation image, controlling the pallet diversion device to divert the pallet to be recycled from the main line of the assembly line to a branch line of the assembly line to realize recycling of the pallet to be recycled — S102 assembly line to realize recycling of the pallet to be recycled.

13 Claims, 19 Drawing Sheets

(58) Field of Classification Search
CPC ........... G05B 2219/32193; G05B 2219/37555; G05B 2219/39553; G05B 2219/40607; G05B 2219/50387; B65B 35/36; B65B 57/10; B65B 61/00
See application file for complete search history.

(56) References Cited

U.S. PATENT DOCUMENTS

2018/0072457 A1* 3/2018 Liang ................. C08G 18/1833
2020/0130935 A1 4/2020 Wagner et al.
2024/0193759 A1* 6/2024 Seo ........................... G06T 7/00

FOREIGN PATENT DOCUMENTS

| | | | |
|---|---|---|---|
| CN | 211766587 | U | 10/2020 |
| CN | 113518753 | A | 10/2021 |
| CN | 113533359 | A | 10/2021 |
| CN | 116605464 | A | 8/2023 |
| JP | 62-39434 | A | 2/1987 |

OTHER PUBLICATIONS

Decision to Grant a Patent issued Jan. 16, 2025 in connection with Japanese Patent Application No. 2024-230274.

* cited by examiner

Figure 1:
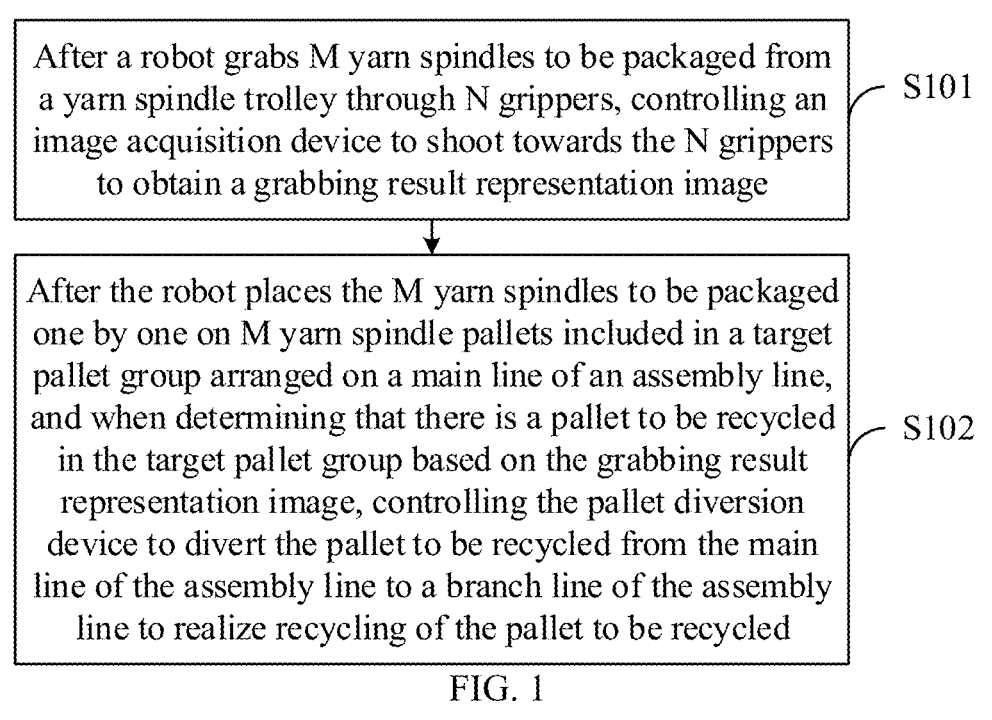

After a robot grabs M yarn spindles to be packaged from a yarn spindle trolley through N grippers, controlling an image acquisition device to shoot towards the N grippers to obtain a grabbing result representation image

S101

After the robot places the M yarn spindles to be packaged one by one on M yarn spindle pallets included in a target pallet group arranged on a main line of an assembly line, and when determining that there is a pallet to be recycled in the target pallet group based on the grabbing result representation image, controlling the pallet diversion device to divert the pallet to be recycled from the main line of the assembly line to a branch line of the assembly line to realize recycling of the pallet to be recycled

Defect detection network

Yarn spindle image

First network layer

K feature representation graphs

Second network layer

K feature representation graphs

Third network layer

Defect detection result

PALLET RECYCLING METHOD, ELECTRONIC DEVICE AND STORAGE MEDIUM

CROSS-REFERENCE TO RELATED APPLICATIONS

The present application claims priority to Chinese Patent Application No. CN202311863182.0, filed with the China National Intellectual Property Administration on Dec. 29, 2023, the disclosure of which is hereby incorporated herein by reference in its entirety.

TECHNICAL FIELD

The present disclosure relates to the field of computer and automatic control, and in particular to a pallet recycling method and apparatus, an electronic device and a storage medium.

BACKGROUND

The packaging of yarn spindles is an important link in a yarn production process. During the packaging process of yarn spindles, due to manual picking, missing placement and other reasons, there may be some pallets to be recycled in a plurality of yarn spindle pallets on the assembly line. At present, in order to prevent these pallets to be recycled from affecting the packaging progress of yarn spindles, these pallets are usually recycled using a manual recycling method. However, the manual recycling method not only wastes a lot of human resources, but also affects recycling efficiency of the pallets to be recycled.

SUMMARY

The present disclosure provides a pallet recycling method and apparatus, an electronic device and a storage medium, to solve or alleviate one or more technical problems in the prior art.

In a first aspect, the present disclosure provides a pallet recycling method applied to an electronic device included in a yarn spindle packaging system, where the electronic device communicates with an image acquisition device and a pallet diversion device respectively; and where the method includes:

after a robot grabs M yarn spindles to be packaged from a yarn spindle trolley through N grippers, controlling the image acquisition device to shoot towards the N grippers to obtain a grabbing result representation image; where each of the N grippers is capable of grabbing one yarn spindle to be packaged, N≥2 and N is an integer, 0≤M≤N and M is an integer; and after the robot places the M yarn spindles to be packaged one by one on M yarn spindle pallets included in a target pallet group arranged on a main line of an assembly line, and when determining that there is a pallet to be recycled in the target pallet group based on the grabbing result representation image, controlling the pallet diversion device to divert the pallet to be recycled from the main line of the assembly line to a branch line of the assembly line to realize recycling of the pallet to be recycled; where the pallet to be recycled is an empty first pallet to be recycled or a second pallet to be recycled on which a yarn spindle to be packaged is initially evaluated as a graded yarn spindle.

In a second aspect, the present disclosure provides a pallet recycling apparatus, applied to an electronic device included in a yarn spindle packaging system, where the electronic device communicates with an image acquisition device and a pallet diversion device respectively; and where the apparatus includes:

an image obtaining unit configured to, after a robot grabs M yarn spindles to be packaged from a yarn spindle trolley through N grippers, control the image acquisition device to shoot towards the N grippers to obtain a grabbing result representation image; where each of the N grippers is capable of grabbing one yarn spindle to be packaged, N≥2 and N is an integer, 0≤M≤N and M is an integer; and a recycling control unit configured to, after the robot places the M yarn spindles to be packaged one by one on M yarn spindle pallets included in a target pallet group arranged on a main line of an assembly line, and when determining that there is a pallet to be recycled in the target pallet group based on the grabbing result representation image, control the pallet diversion device to divert the pallet to be recycled from the main line of the assembly line to a branch line of the assembly line to realize recycling of the pallet to be recycled; where the pallet to be recycled is an empty first pallet to be recycled or a second pallet to be recycled on which a yarn spindle to be packaged is initially evaluated as a graded yarn spindle.

In a third aspect, provided is an electronic device, including:

at least one processor; and a memory connected in communication with the at least one processor;

where the memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, and the computer instruction is used to cause a computer to execute the method of any embodiment of the present disclosure.

In a fifth aspect, provided is a computer program product including a computer program, and the computer program implements the method of any embodiment of the present disclosure, when executed by a processor.

In the technical solution provided by the present disclosure, after the robot grabs the M yarn spindles to be packaged from the yarn spindle trolley through the N grippers, the image acquisition device can be controlled to shoot towards the N grippers to obtain the grabbing result representation image; and after the robot places the M yarn spindles to be packaged one by one on M yarn spindle pallets included in the target pallet group arranged on the main line of the assembly line, and when it is determined that there is a pallet to be recycled in the target pallet group based on the grabbing result representation image, the pallet diversion device can be controlled to divert the pallet to be recycled from the main line of the assembly line to the branch line of the assembly line, to realize recycling of the pallet to be recycled. In this way, automatic recycling of the pallet to be recycled can be achieved, which can save a lot of human resources while improving recycling efficiency of the pallet to be recycled, compared to the current manual recycling method.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

FIG. 1 is a schematic flowchart of a pallet recycling method according to an embodiment of the present disclosure;

DETAILED DESCRIPTION

Figure 2A:
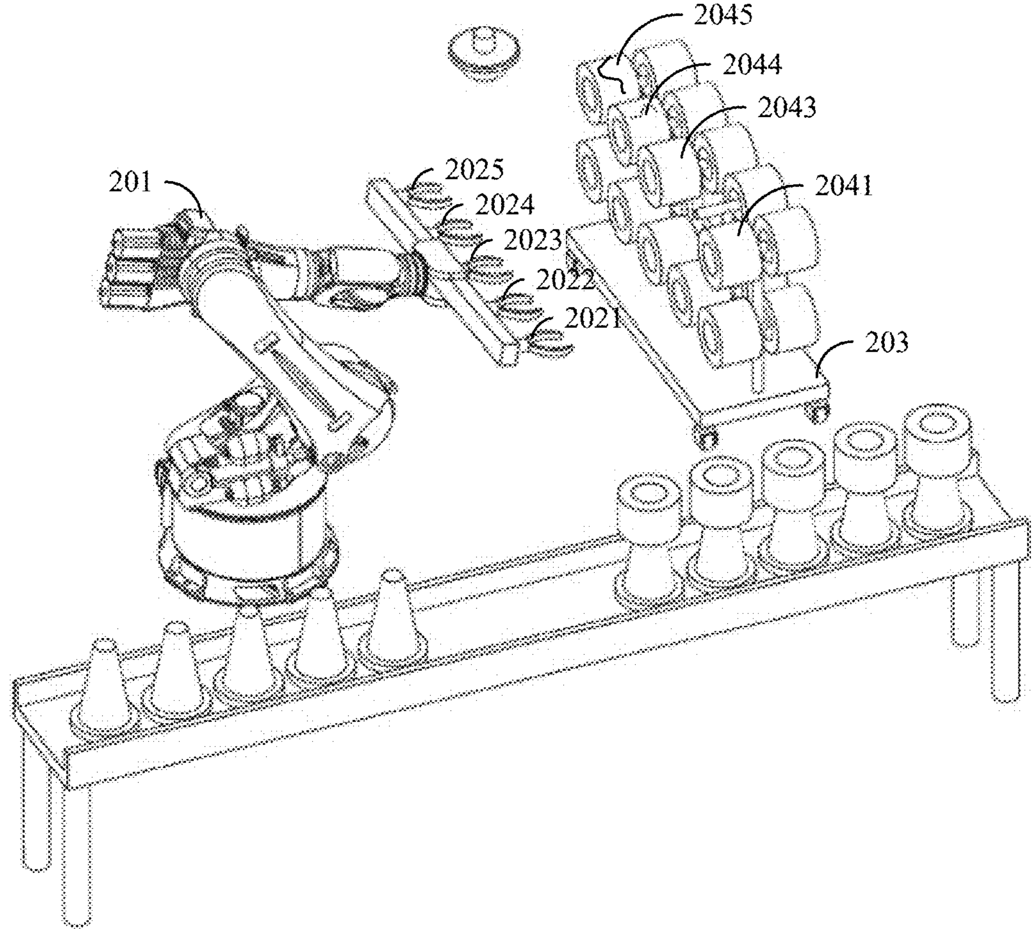
FIGS. 2A to 2F are example diagrams of a process of obtaining the grabbing result representation image in the pallet recycling method according to an embodiment of the present disclosure.

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

As mentioned above, packaging of yarn spindles is an important link in a yarn production process. During a packaging process of yarn spindles, due to manual picking, missing placement and other reasons, there may be some pallets to be recycled, such as empty yarn spindle pallets or other yarn spindle pallets that need to be recycled, in a plurality of yarn spindle pallets on the assembly line. At present, in order to prevent these pallets to be recycled from affecting the packaging progress of yarn spindles, these pallets are usually recycled using a manual recycling method. However, the manual recycling method not only wastes a lot of human resources, but also affects recycling efficiency of the pallets to be recycled.

In order to save the lot of human resources and simultaneously improve the recycling efficiency of the pallets to be recycled, an embodiment of the present disclosure provides a pallet recycling method applied to an electronic device included in a yarn spindle packaging system, and the electronic device communicates with an image acquisition device and a pallet diversion device respectively. Here, the electronic device may be a computer, a programmable logic controller (PLC), etc.; the image acquisition device may be an industrial camera; the pallet diversion device may be a pneumatic diverter, an electric diverter, a roller diverter, etc., which are not limited in the embodiments of the present disclosure.

Moreover, it should be noted that the main types of yarn spindle products in the embodiments of the present disclosure may include at least one of partially oriented yarns (POY), fully drawn yarns (FDY), draw textured yarns (DTY) (or called low-elastic yarns), etc. For example, the types of yarn spindle products may specifically include polyester partially oriented yarns, polyester fully drawn yarns, polyester drawn yarns, polyester draw textured yarns, etc.

FIG. 1 is a schematic flowchart of a pallet recycling method according to an embodiment of the present disclosure. The pallet recycling method according to the embodiment of the present disclosure will be described below with reference to FIG. 1. It should be noted that a logical sequence is shown in the schematic flowchart, but the steps shown or described may also be performed in other sequences in some cases.

Step S101: After a robot grabs M yarn spindles to be packaged from a yarn spindle trolley through N grippers, the image acquisition device is controlled to shoot towards the N grippers to obtain a grabbing result representation image.

Here, the robot may be an N-axis industrial robot, that is, the robot may include N grippers, and each of the N grippers is capable of grabbing one yarn spindle to be packaged. Here, $N \geq 2$, and N is an integer.

It may be understood that, in the embodiment of the present disclosure, when the robot grabs the yarn spindles to be packaged from the yarn spindle trolley through the N grippers, some grippers may fail to grab the yarn spindles to be packaged. Therefore, 0≤M≤N and M is an integer in the embodiment of the present disclosure. Specifically, when the robot grabs the yarn spindles to be packaged from the yarn spindle trolley through the N grippers, if all grippers successfully grab the yarn spindles to be packaged, M=N; if some grippers fail to grab the yarn spindles to be packaged, 0≤M<N and M is an integer.

Step S102: After the robot places the M yarn spindles to be packaged one by one on M yarn spindle pallets included in a target pallet group arranged on a main line of an assembly line, and when it is determined that there is a pallet to be recycled in the target pallet group based on the grabbing result representation image, the pallet diversion device is controlled to divert the pallet to be recycled from the main line of the assembly line to a branch line of the assembly line to realize recycling of the pallet to be recycled.

Here, the pallet to be recycled is an empty first pallet to be recycled or a second pallet to be recycled on which a yarn spindle to be packaged is initially evaluated as a graded yarn spindle. Here, the graded yarn spindle may be a non-AA grade yarn spindle product, that is, may be a yarn spindle product that is downgraded from the default grade AA to another grade (for example, grade A, grade B, grade C) due to quality reasons, and the quality reasons may be broken filament, oil stain, yarn tripping, poor molding or paper tube damage or others.

It should be noted that, in the embodiment of the present disclosure, the target pallet group generally includes a fixed quantity of yarn spindle pallets. For example, the target pallet group may include a total of N yarn spindle pallets, and the N yarn spindle pallets correspond to the N grippers one by one. Therefore, when the robot grabs the yarn spindles to be packaged from the yarn spindle trolley through the N grippers, if some grippers fail to grab the yarn spindles to be packaged (at this time, 0≤M<N), there will be some empty first pallets to be recycled in the target pallet group after the robot places the M yarn spindles to be packaged one by one on the M yarn spindle pallets included in the target pallet group arranged on the main line of the assembly line. Moreover, in the embodiment of the present disclosure, the M yarn spindles to be packaged grabbed by the robot from the yarn spindle trolley through the N grippers may also have the second pallet to be recycled that is initially evaluated as a graded yarn spindle.

Using the pallet recycling method provided in the embodiment of the present disclosure, after the robot grabs the M yarn spindles to be packaged from the yarn spindle trolley through the N grippers, the image acquisition device can be controlled to shoot towards the N grippers to obtain the grabbing result representation image; and after the robot places the M yarn spindles to be packaged one by one on M yarn spindle pallets included in the target pallet group arranged on the main line of the assembly line, and when it is determined that there is a pallet to be recycled in the target pallet group based on the grabbing result representation image, the pallet diversion device can be controlled to divert the pallet to be recycled from the main line of the assembly line to the branch line of the assembly line, to realize recycling of the pallet to be recycled. In this way, the automatic recycling of the pallet to be recycled can be achieved, which saves a lot of human resources while improving recycling efficiency of the pallet to be recycled, compared to the current manual recycling method.

In some optional implementations, the electronic device further communicates with the robot, and the step S101 of "controlling the image acquisition device to shoot towards the N grippers to obtain a grabbing result representation image" may include the following steps.

Step S1011: The N grippers are controlled to rotate relative to the image acquisition device.

In an example, the N grippers of the robot may be connected to the main structure of the robot via a same mechanical axis. Based on this, the mechanical axis may be rotated so that the N grippers rotate as a whole relative to the image acquisition device in the embodiment of the present disclosure.

Step S1012: The image acquisition device is controlled to shoot towards the N grippers to obtain Z images to be processed during rotation of the N grippers relative to the image acquisition device.

Here, Z≥2 and Z is an integer.

Since the image acquisition device shoots towards the N grippers to obtain Z images to be processed during rotation of the N grippers relative to the image acquisition device, the Z images to be processed correspond to different viewing angles of the N grippers.

Step S1013: The grabbing result representation image is obtained based on the Z images to be processed.

In an example, the Z images to be processed may be processed by decomposition, splicing and other operations, to obtain the grabbing result representation image.

Referring to FIG. 2A, by way of example, the robot 201 may include five grippers: a first gripper 2021, a second gripper 2022, a third gripper 2023, a fourth gripper 2024 and a fifth gripper 2025 (that is, N=5 in this example). Due to manual picking, missing placement and other reasons, there is a group of yarn spindles to be packaged on a yarn spindle trolley 203, including only four yarn spindles to be packaged: a first yarn spindle 2041 to be packaged, a third yarn spindle 2043 to be packaged, a fourth yarn spindle 2044 to be packaged and a fifth yarn spindle 2045 to be packaged. Then referring to FIG. 2B, when the robot 201 grabs the yarn spindles to be packaged from the yarn spindle trolley 203 through five grippers, the first gripper 2021 successfully grabs the first yarn spindle 2041 to be packaged, the second gripper 2022 fails to grab a yarn spindle to be packaged, the third gripper 2023 successfully grabs the third yarn spindle 2043 to be packaged, the fourth gripper 2024 successfully grabs the fourth yarn spindle 2044 to be packaged, and the fifth gripper 2025 successfully grabs the fifth yarn spindle 2045 to be packaged. After the robot 201 grabs four yarn spindles to be packaged from the yarn spindle trolley 203 through the five grippers, a mechanical axis 205 for connecting the five grippers to the main structure of the robot 201 may be rotated so that the five grippers rotate as a whole relative to an image acquisition device 206. Specifically, the mechanical axis 205 may be rotated in the direction "A1→A2", so that the five grippers rotate as a whole relative to the image acquisition device 206. During rotation of the five grippers relative to the image acquisition device 206, the image acquisition device 206 may be controlled to shoot towards the five grippers to obtain Z images to be processed, so as to ensure that the Z images to be processed correspond to different viewing angles of the N grippers.

Figure 2B:
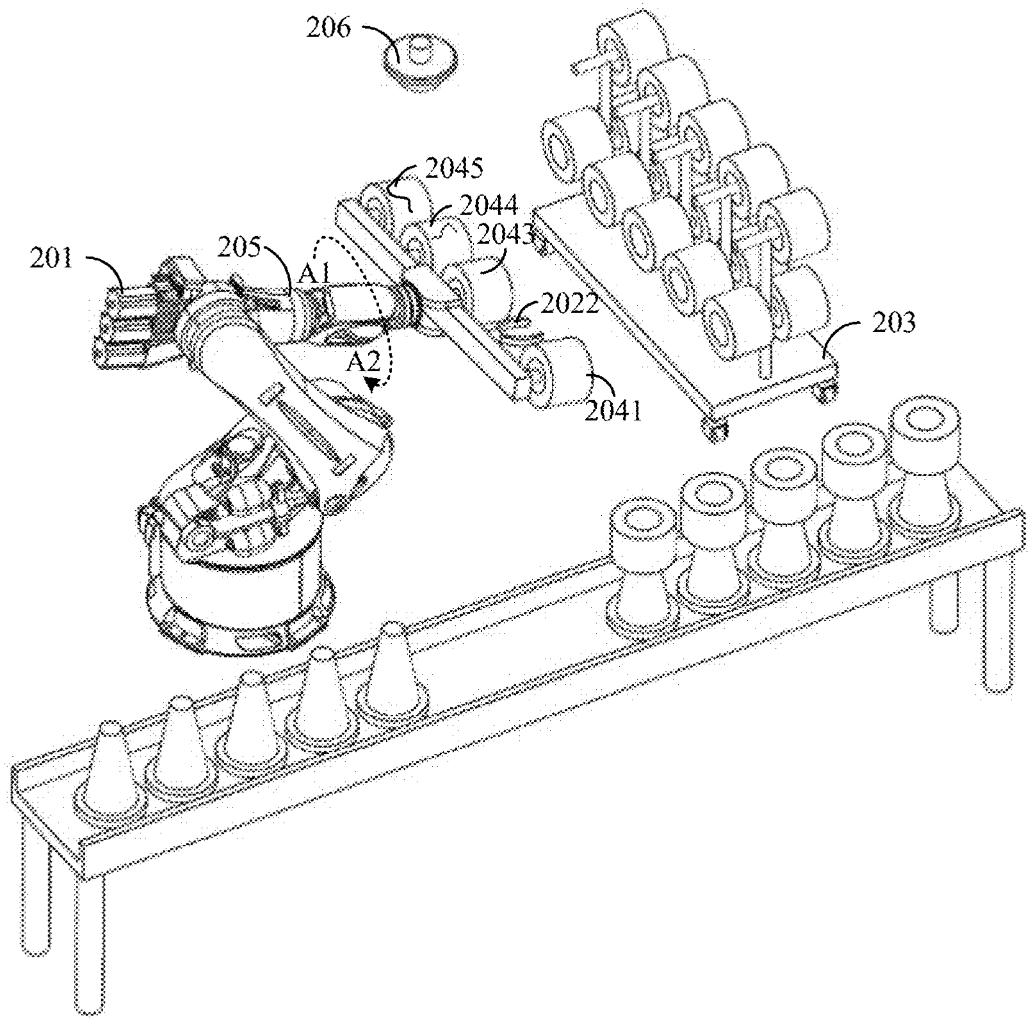

Taking Z=2 for example, when the five grippers rotate to the first angle as shown in FIG. 2B relative to the image acquisition device 206, the image acquisition device 206 may be controlled to shoot towards the five grippers to obtain a first image to be processed. The first image to be processed is mainly used to represent image features of the four yarn spindles to be packaged on the first side, that is, the first image to be processed may include: a single-view image SD11 for representing an image feature of the first yarn spindle 2041 to be packaged on the first side, a single-view image SD31 for representing an image feature of the third yarn spindle 2043 to be packaged on the first side, a single-view image SD41 for representing an image feature of the fourth yarn spindle 2044 to be packaged on the first side, and a single-view image SD51 for representing an image feature of the fifth yarn spindle 2045 to be packaged on the first side, specifically shown in FIG. 2C. In addition, since the second gripper 2022 fails to grab a yarn spindle to be packaged, the second gripper 2022 is not blocked by the yarn spindle to be packaged, so that the first image to be processed may further include a single-view image SZ21 for representing an image feature of the second gripper 2022 on the first side.

Figure 2C:
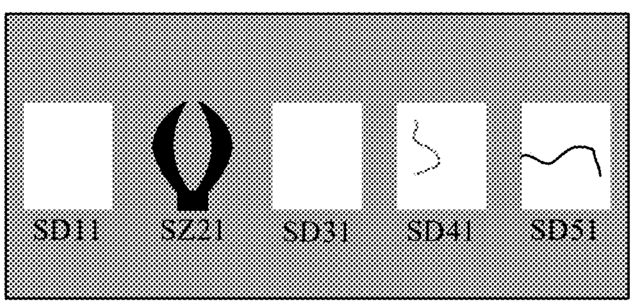
Figure 2D:
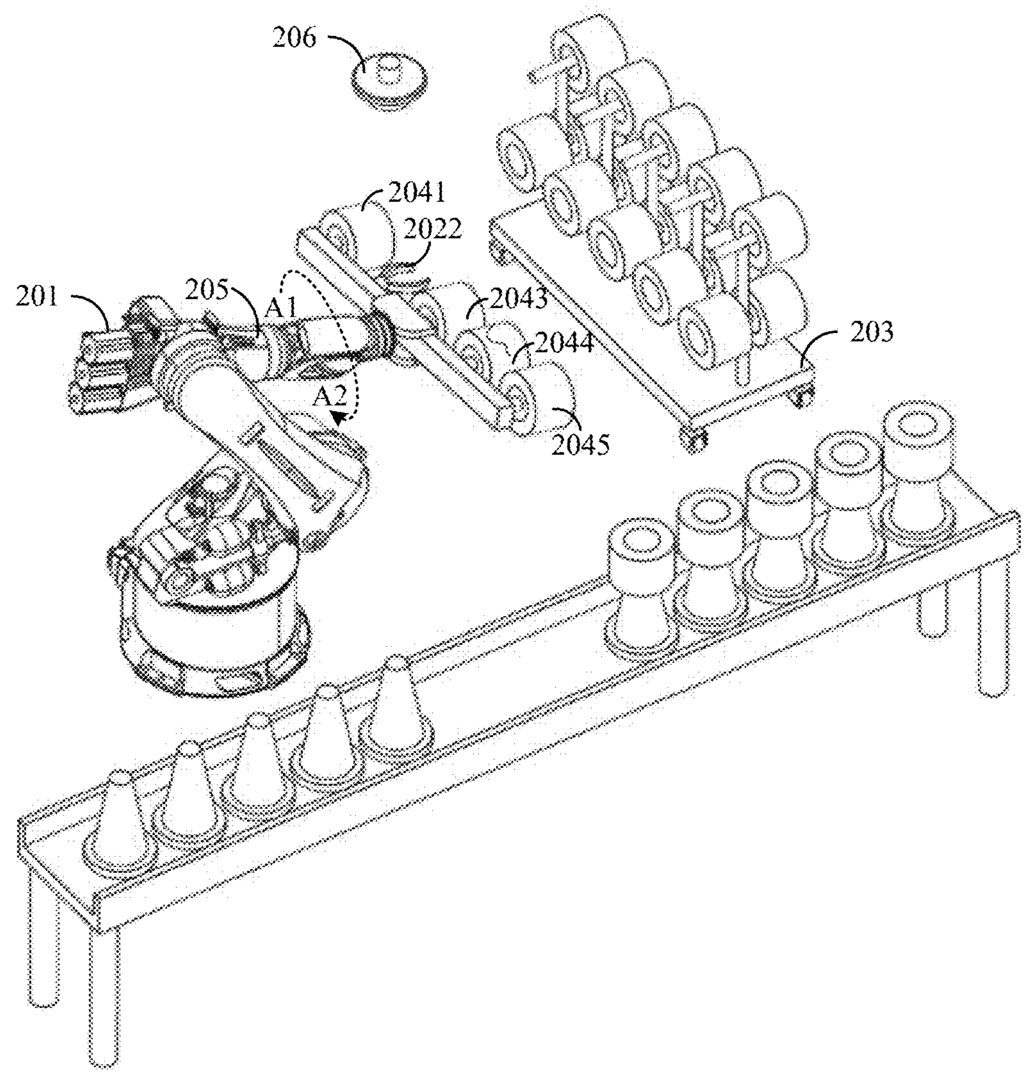

Similarly, when the five grippers rotate to the second angle as shown in FIG. 2D relative to the image acquisition device 206, the image acquisition device 206 is controlled to shoot towards the five grippers to obtain a second image to be processed. The second image to be processed is mainly used to represent the image features of the four yarn spindles to be packaged on the second side opposite to the first side, that is, the second image to be processed may include: a single-view image SD12 for representing an image feature of the first yarn spindle 2041 to be packaged on the second side, a single-view image SD32 for representing an image feature of the third yarn spindle 2043 to be packaged on the second side, a single-view image SD42 for representing an image feature of the fourth yarn spindle 2044 to be packaged on the second side, and a single-view image SD52 for representing an image feature of the fifth yarn spindle 2045 to be packaged on the second side, specifically shown in FIG. 2E. In addition, since the second gripper 2022 fails to grab a yarn spindle to be packaged, the second gripper 2022 is not blocked by the yarn spindle to be packaged, so that the second image to be processed may further include a single-view image SZ22 for representing an image feature of the second gripper 2022 on the second side.

Moreover, it should be noted that the first image to be processed shown in FIG. 2B and the second image to be processed shown in FIG. 2D are pre-processed in the embodiment of the present disclosure. Here, the pre-processing may include cropping, denoising, feature enhancement, etc., which is not limited in the embodiment of the present disclosure.

After the first image to be processed and the second image to be processed are obtained, the Z images to be processed may be processed by decomposition, splicing and other operations, to obtain the grabbing result representation image.

Through the above steps included in step S101, in the embodiment of the present disclosure, after the robot grabs the M yarn spindles to be packaged from the yarn spindle trolley through the N grippers, the N grippers are controlled to rotate relative to the image acquisition device, the image acquisition device is controlled to shoot toward the N grippers to obtain Z images to be processed (the Z images to be processed correspond to different viewing angles of the N grippers) during rotation of the N grippers relative to the image acquisition device, and then the grabbing result representation image is obtained based on the Z images to be processed. In this way, the grabbing result representation image can fully represent the M yarn spindles to be packaged grabbed by the N grippers, which avoids feature omissions, thereby reducing a misjudgment rate of the pallets to be recycled to improve accuracy in recycling pallets.

Further, in some optional implementations, step S1013 may include the following steps.

Step S10131: N single-view images are intercepted from each of the Z images to be processed to obtain N×Z single-view images.

Here, the N single-view images correspond to the N grippers one by one.

Step S10132: Z single-view images corresponding to a same gripper among the N×Z single-view images are spliced to obtain N multi-view images.

Step S10133: The grabbing result representation image is obtained based on the N multi-view images.

In an example, the N multi-view images may be tiled according to the sort order of the N grippers on the robot to obtain the grabbing result representation image.

Figure 2E:
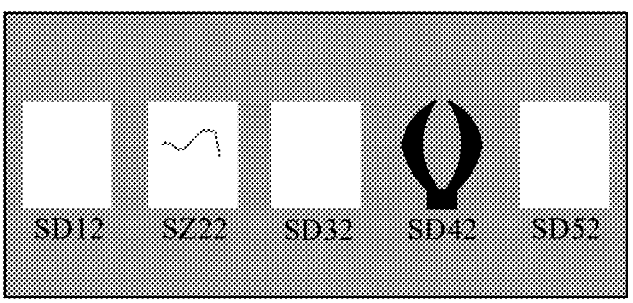

Continuing with the above example (N=5 and Z=2 in this example), after the first image to be processed as shown in FIG. 2C and the second image to be processed as shown in FIG. 2E are obtained, five single-view images, i.e., a single-view image SD11, a single-view image SZ21, a single-view image SD31, a single-view image SD41 and a single-view image SD51, may be intercepted from the first image to be processed; and similarly, five single-view images, i.e., a single-view image SD21, a single-view image SZ22, a single-view image SD32, a single-view image SD42 and a single-view image SD52, may be intercepted from the second image to be processed. Two single-view images corresponding to a same gripper among the 5×2=10 single-view images are spliced to obtain five multi-view images: a multi-view image SD11&SD12 corresponding to the first gripper 2021, a multi-view image SZ21&SZ22 corresponding to the second gripper 2022, a multi-view image SD31&SD32 corresponding to the third gripper 2023, a multi-view image SD41&SD42 corresponding to the fourth gripper 2024, and a multi-view image SD51&SD52 corresponding to the fifth gripper 2025. Then the five multi-view images are tiled according to the sort order of the five grippers on the robot, to obtain the grabbing result representation image, specifically shown in FIG. 2F.

Through the above steps included in step S1013, a specific manner for obtaining the grabbing result representation image is provided in the embodiment of the present disclosure. This obtaining manner has a simple process, which can improve the execution efficiency of the pallet recycling method.

After step S101 is executed, the robot may be controlled to place the M yarn spindles to be packaged one by one on the M yarn spindle pallets included in the target pallet group arranged on the main line of the assembly line. Continuing with the above example (M=4 in this example) in combination with FIGS. 2G and 2H, it is assumed that the target pallet group arranged on the main line 207 of the assembly line includes a total of 5 yarn spindle pallets: a first yarn spindle pallet 2081 corresponding to the first gripper 2021, a second yarn spindle pallet 2082 corresponding to the second gripper 2022, a third yarn spindle pallet 2083 corresponding to the third gripper 2023, a fourth yarn spindle pallet 2084 corresponding to the fourth gripper 2024, and a fifth yarn spindle pallet 2085 corresponding to the fifth gripper 2025. Then, the robot 201 may be controlled to place the first yarn spindle 2041 to be packaged on the first yarn spindle pallet 2081, the third yarn spindle 2043 to be packaged on the third yarn spindle pallet 2083, the fourth yarn spindle 2044 to be packaged on the fourth yarn spindle pallet 2084, and the fifth yarn spindle 2045 to be packaged on the fifth yarn spindle pallet 2085.

Moreover, as mentioned above, in the embodiment of the present disclosure, the grabbing result representation image may include N multi-view images corresponding to the N grippers one by one, and the target pallet group may include a total of N yarn spindle pallets corresponding to the N grippers one by one, so a one-to-one correspondence between the N yarn spindle pallets and the N multi-view images can be established.

Figure 2F:
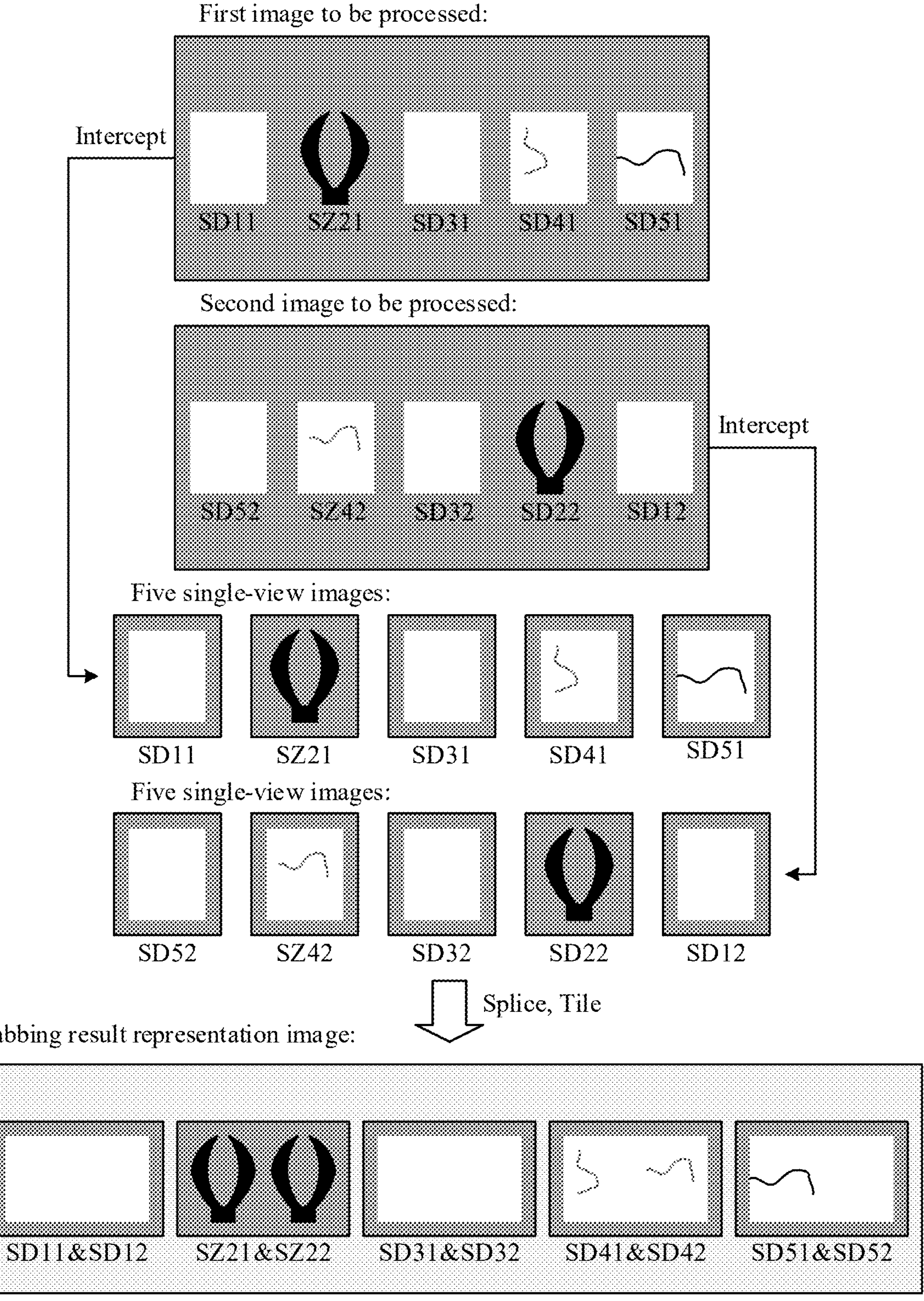
Figure 2G:
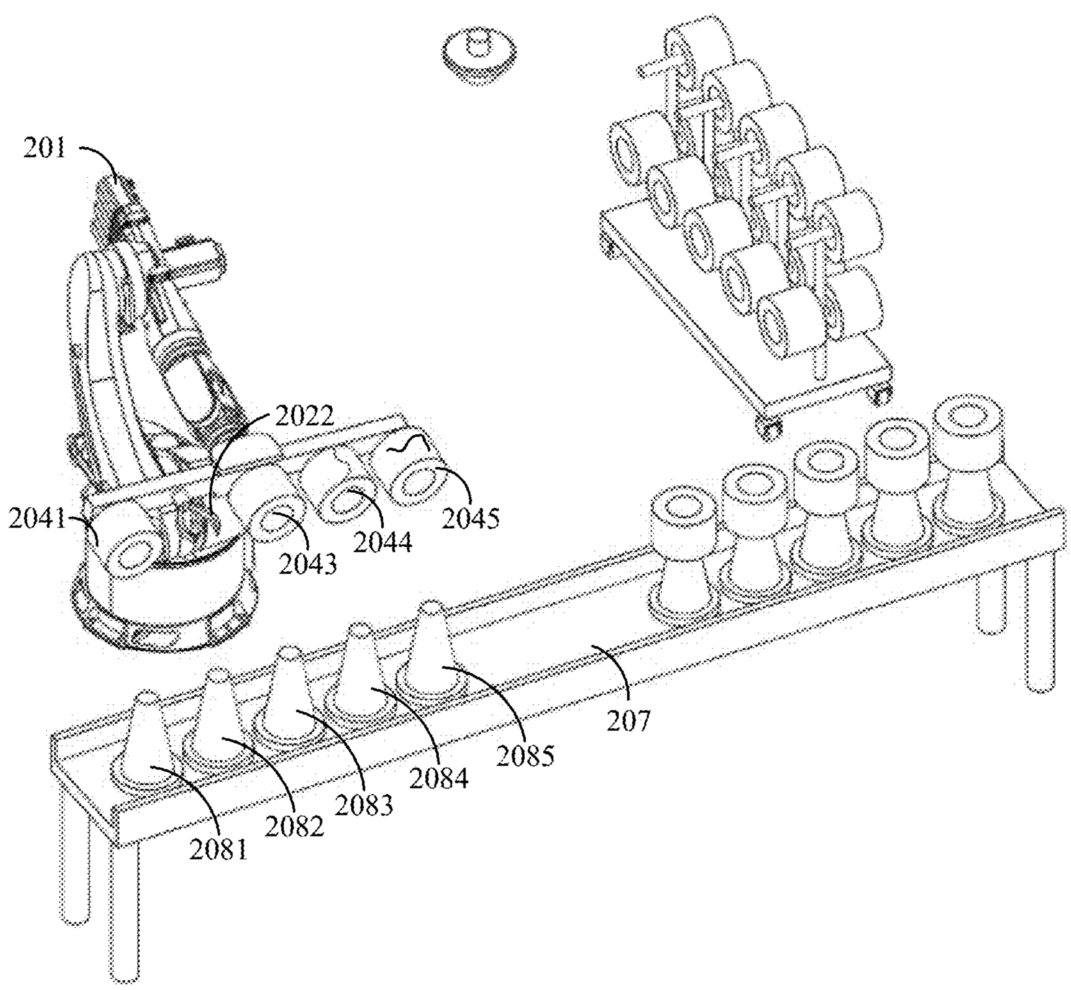
FIGS. 2G, 2H and 2I are example diagrams of a process of establishing a correspondence between N yarn spindle pallets and N multi-view images in the pallet recycling method according to an embodiment of the present disclosure.
Figure 2H:
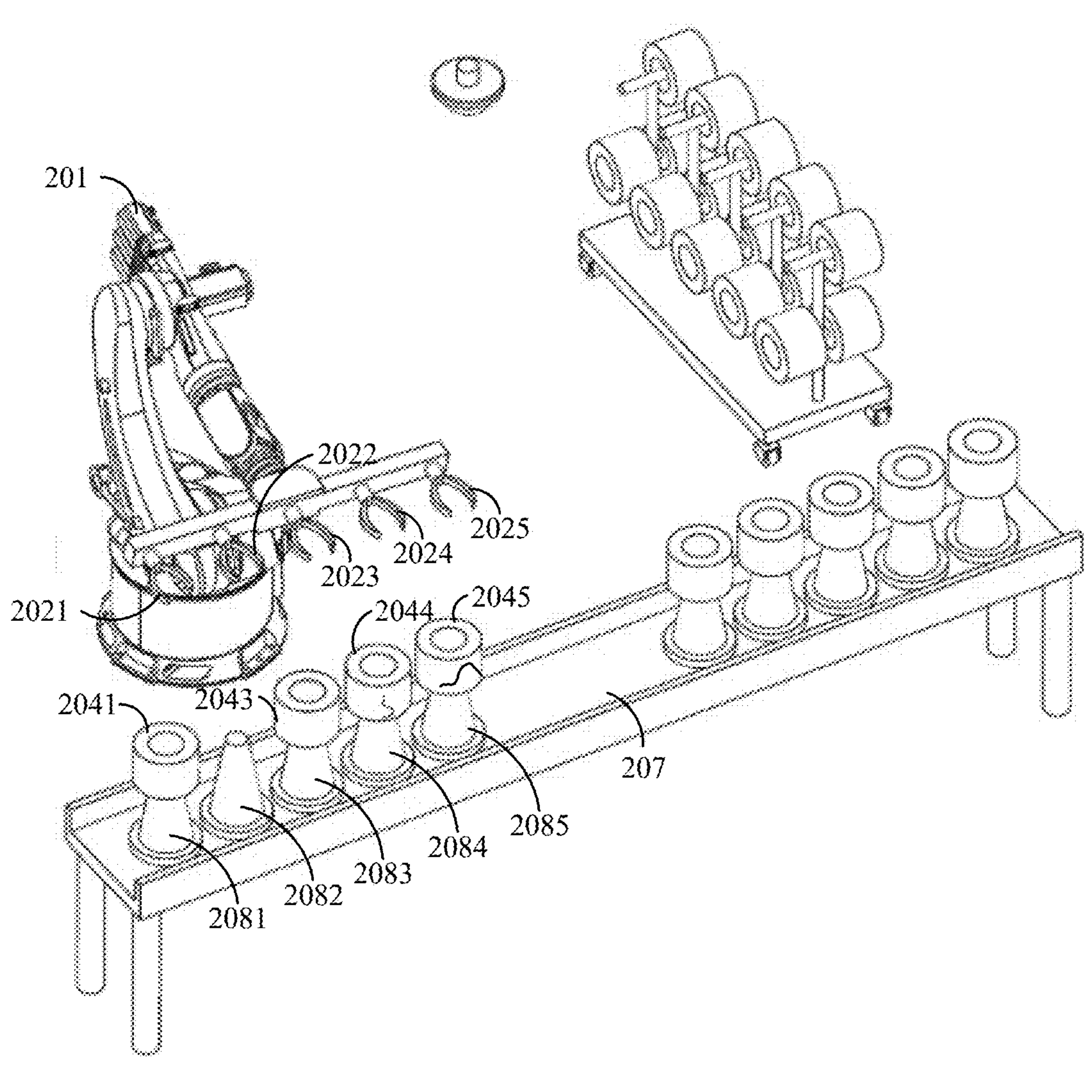

Continuing with the above example, the grabbing result representation image includes 5 multi-view images: a multi-view image SD11&SD12 corresponding to the first gripper 2021, a multi-view image SZ21&SZ22 corresponding to the second gripper 2022, a multi-view image SD31&SD32 corresponding to the third gripper 2023, a multi-view image SD41&SD42 corresponding to the fourth gripper 2024, and a multi-view image SD51&SD52 corresponding to the fifth gripper 2025; and the target pallet group includes a total of 5 yarn spindle pallets: a first yarn spindle pallet 2081 corresponding to the first gripper 2021, a second yarn spindle pallet 2082 corresponding to the second gripper 2022, a third yarn spindle pallet 2083 corresponding to the third gripper 2023, a fourth yarn spindle pallet 2084 corresponding to the fourth gripper 2024, and a fifth yarn spindle pallet 2085 corresponding to the fifth gripper 2025, as shown in FIGS. 2F, 2G and 2H. Then, a one-to-one correspondence between the N yarn spindle pallets and the N multi-view images can be established:

multi-view image SD11&SD12⇆first yarn spindle pallet 2081;

multi-view image SZ21&SZ22⇆second yarn spindle pallet 2082;

multi-view image SD31&SD32⇆third yarn spindle pallet 2083;

multi-view image SD41&SD42⇆fourth yarn spindle pallet 2084;

multi-view image SD51&SD52⇆fifth yarn spindle pallet 2085.

Figures 2I, 3A:
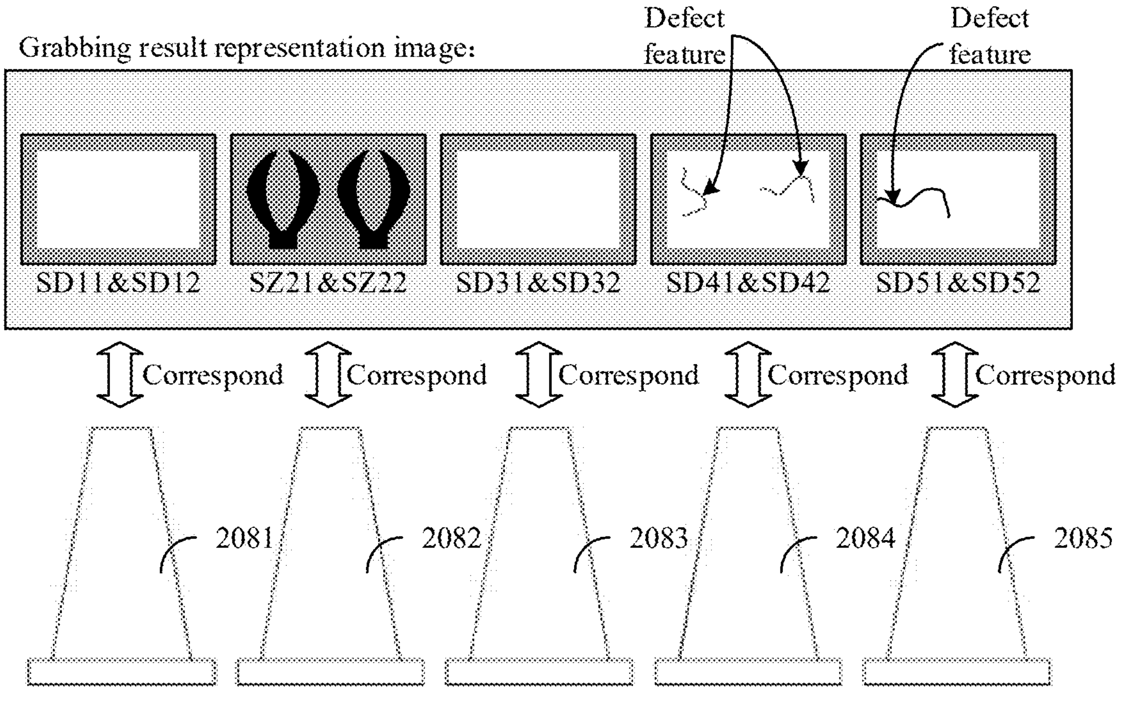
FIG. 3A is a structural schematic diagram of a defect detection network according to an embodiment of the present disclosure.

The above correspondence may be specifically shown in FIG. 2I.

Based on the above description, in some optional implementations, the step S102 of "determining that there is a pallet to be recycled in the target pallet group based on the grabbing result representation image" may include the following steps.

Step S1021: For each of the N multi-view images, when it is determined that there is no yarn spindle image for representing a yarn spindle to be packaged in the multi-view image, it is determined that there is a pallet to be recycled in the target pallet group, and a yarn spindle pallet corresponding to the multi-view image among the N yarn spindle pallets is taken as the first pallet to be recycled.

In an example, a connected region analysis method (i.e., Blob analysis method, also called BlobAnalysis), a template matching method, a deep learning method or the like may be used to determine whether there is a yarn spindle image for representing a yarn spindle to be packaged in the multi-view image.

Moreover, in the embodiment of the present disclosure, after the first pallet to be recycled is determined from the N yarn spindle pallets, a pallet identifier of the first pallet to be recycled may be recorded and sent to the pallet diversion device. Here, the pallet identifier may be a pallet code.

Step S1022: When it is determined that there is a yarn spindle image for representing a yarn spindle to be packaged in the multi-view image and it is determined that the yarn spindle image has a defect feature through a defect detection network, it is determined that there is a pallet to be recycled in the target pallet group, and a yarn spindle pallet corresponding to the multi-view image among the N yarn spindle pallets is taken as the second pallet to be recycled.

Here, the defect feature may include at least one of broken filament feature, oil stain feature, yarn tripping feature, poor molding, or paper tube damage, etc.

In an example, the defect detection network may be implemented by combining a U-net network with a residual network (i.e., ResNet), or may be implemented based on convolutional neural networks (CNN) or other suitable neural networks, which is not limited in the embodiment of the present disclosure. Here, the U-net network is a neural network model with a "U"-shaped structure, the left side of the U-net network is used to realize image feature extraction, and the right side thereof is used to realize upsample processing of image features.

Moreover, in the embodiment of the present disclosure, after the second pallet to be recycled is determined from the N yarn spindle pallets, the pallet identifier of the second pallet to be recycled may also be recorded and sent to the pallet diversion device.

Continuing with the above example, the grabbing result representation image includes 5 multi-view images, the target pallet group includes 5 yarn spindle pallets in total, and the 5 multi-view images and the 5 yarn spindle pallets have a one-to-one correspondence as shown in FIG. 2I. Then, when step S1021 is executed, it may be determined that there is no yarn spindle image for representing a yarn spindle to be packaged in the multi-view image SZ21&SZ22, so it may be determined that there is a pallet to be recycled in the target pallet group, the second yarn spindle pallet 2082 corresponding to the multi-view image SZ21&SZ22 among the five yarn spindle pallets is taken as the first pallet to be recycled, and a pallet identifier of the first pallet to be recycled is recorded and then sent to the pallet diversion device; when step S1022 is executed, it may be determined that the multi-view image SD41&SD42 and the multi-view image SD51&SD52 have defect features, so it may be determined that there are pallets to be recycled in the target pallet group, the fourth yarn spindle pallet 2084 corresponding to the multi-view image SD41&SD42 and the fifth yarn spindle pallet 2085 corresponding to the multi-view image SD51&SD52 among the five yarn spindle pallets are both taken as the second pallets to be recycled, and pallet identifiers of the second pallets to be recycled are recorded and then sent to the pallet diversion device.

Through the above steps included in step S102, in the embodiment of the present disclosure, on one hand, for each multi-view image, it is firstly judged whether the corresponding pallet to be recycled is the first pallet to be recycled, and then it is judged whether the corresponding pallet to be recycled is the second pallet to be recycled when it is determined that the corresponding pallet to be recycled is not the first pallet to be recycled, thereby reducing the misjudgment rate of the pallet to be recycled through two rounds of cascaded judgment processes to improve accuracy of recycling pallets; and on the other hand, in the embodiment of the present disclosure, since the machine vision method is used to determine the pallets to be recycled, not only can the execution efficiency of the pallet recycling method be improved, but also the accuracy of recycling pallets can be improved.

Referring to FIG. 3A, in a specific example, the defect detection network may include a first network layer, a second network layer and a third network layer.

The first network layer is used to perform feature extraction on the yarn spindle image by combining a channel attention mechanism with a spatial attention mechanism to obtain K feature representation graphs in different scales, where K≥2 and K is an integer; the second network layer is used to perform feature fusion based on the K feature representation graphs to obtain K fused feature graphs, where the K fused feature graphs correspond to the K feature representation graphs one by one; and the third network layer is used to obtain a defect detection result based on the K fused feature graphs, where the defect detection result is used to indicate whether the yarn spindle image has a defect feature.

Figure 3B:
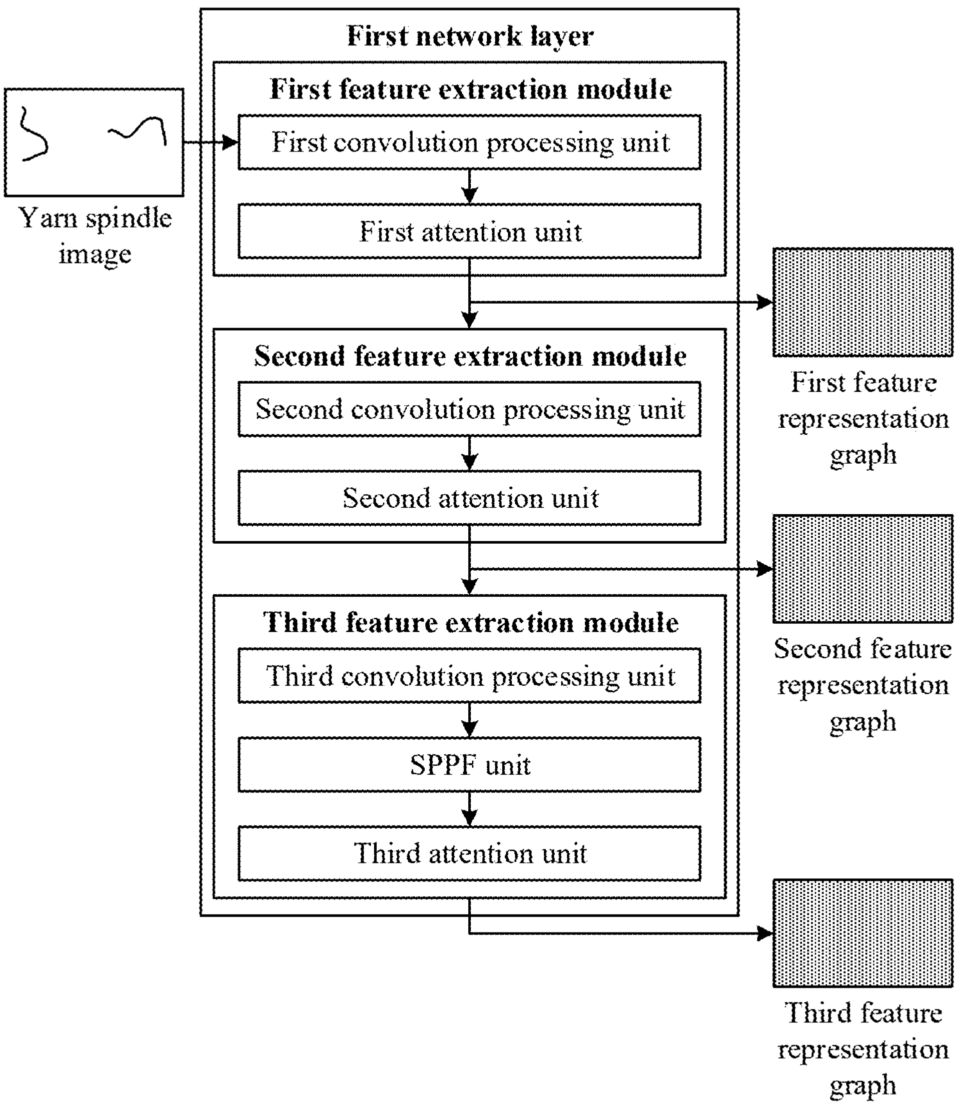
FIG. 3B is a structural schematic diagram of a first network layer according to an embodiment of the present disclosure.

Referring to FIG. 3B, by way of example, the first network layer may include a first feature extraction module, a second feature extraction module and a third feature extraction module that are cascaded (i.e., K=3 in this example).

Here, the first feature extraction module is used to process an input image feature (which may be a yarn spindle image, such as a yarn spindle image in the multi-view image SD41&SD42 shown in FIGS. 2F and 2I) to obtain a first feature representation graph. Further, the first feature extraction module may include a first convolution processing unit and a first attention unit that are cascaded. Here, the first convolution processing unit is used to perform convolution processing on the input image feature, and the first attention unit is used to perform feature extraction on the input image feature by combining the channel attention mechanism with the spatial attention mechanism.

The second feature extraction module is used to process the input image feature (the first feature representation graph) to obtain a second feature representation graph. Further, the second feature extraction module may include a second convolution processing unit and a second attention unit that are cascaded. Here, the second convolution processing unit is used to perform convolution processing on the input image feature, and the second attention unit is used to perform feature extraction on the input image feature by combining the channel attention mechanism with the spatial attention mechanism.

The third feature extraction module is used to process the input image feature (the second feature representation graph) to obtain a third feature representation graph. Further, the third feature extraction module may include a third convolution processing unit, a spatial pyramid pooling fast (SPPF) unit and a third attention unit that are cascaded. Here, the convolution processing unit is used to perform convolution processing on the input image feature, the SPPF unit is used to fuse image features of different receptive fields, and the third attention unit is used to perform feature extraction on the input image feature by combining the channel attention mechanism with the spatial attention mechanism.

Figure 3C:
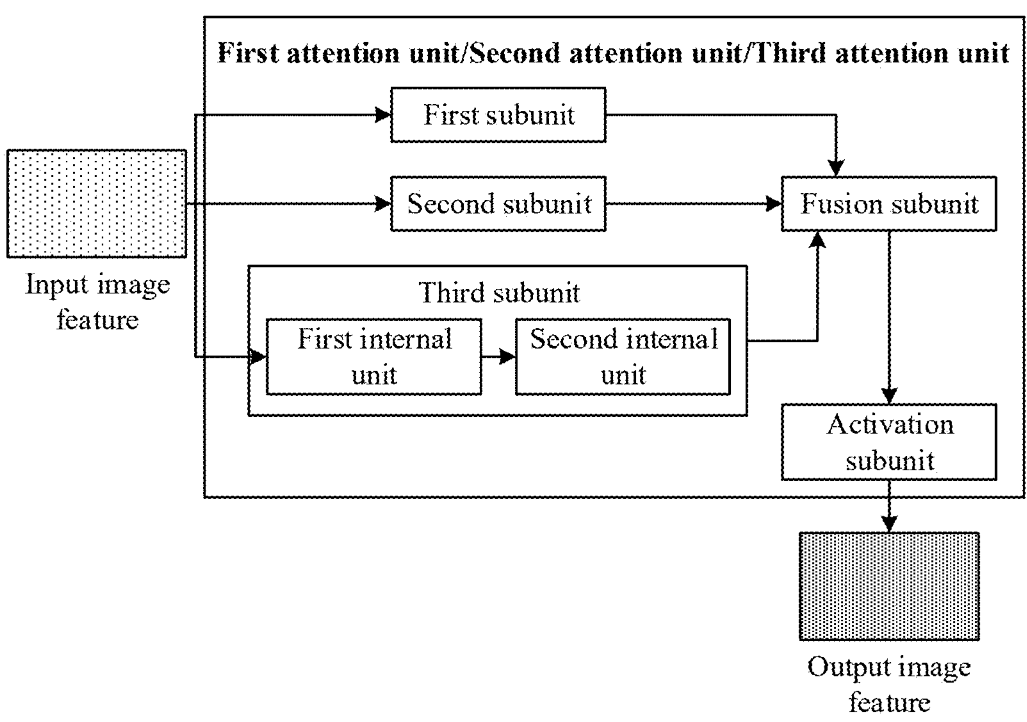
FIG. 3C is a structural schematic diagram of a first attention unit, a second attention unit and a third attention unit according to an embodiment of the present disclosure.

Referring to FIG. 3C, the first attention unit, the second attention unit and the third attention unit may have the same structure in this example, for example, may include a first subunit, a second subunit and a third subunit connected in parallel, and may also include a fusion subunit used to fuse image features output by the first subunit, the second subunit and the third subunit, and an activation subunit used to normalize the image feature output by the fusion subunit (for example, normalize the image feature output by the fusion subunit using a Sigmoid function). Here, the third subunit may include a first internal unit and a second internal unit that are cascaded, the first internal unit and the first subunit may have the same structure, the second internal unit and the second subunit may have the same structure, the first internal unit and the first subunit are used to perform feature extraction on the input image feature based on the channel attention mechanism, and the second internal unit and the second subunit are used to perform feature extraction on the input image feature based on the spatial attention mechanism.

Figure 3D:
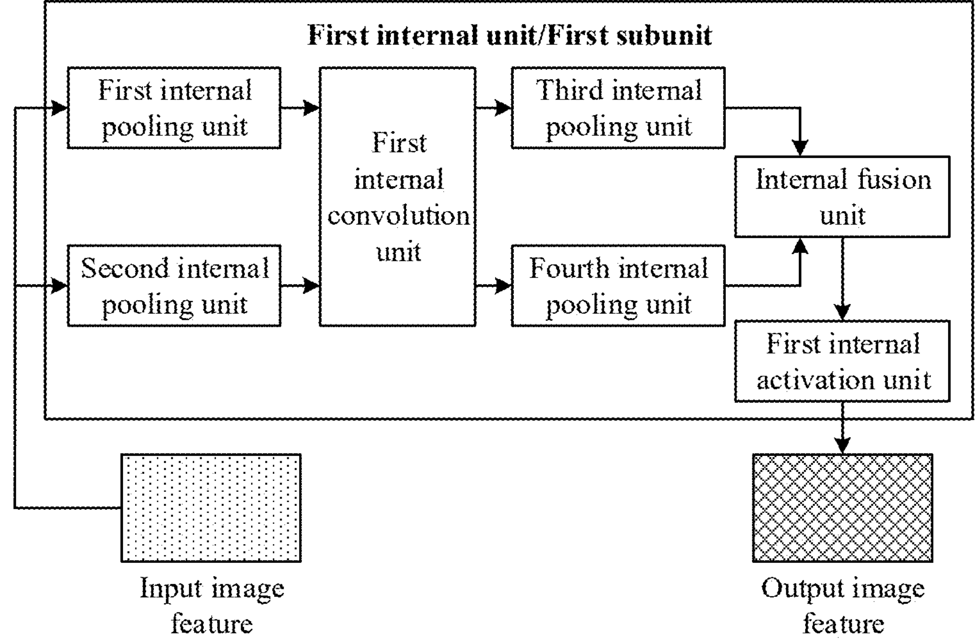
FIG. 3D is a structural schematic diagram of a first internal unit and a first subunit according to an embodiment of the present disclosure.

More specifically, referring to FIG. 3D, the first internal unit and the first subunit may include:

- a first internal pooling unit and a second internal pooling unit connected in parallel;
- a first internal convolution unit cascaded with the first internal pooling unit and the second internal pooling unit connected in parallel;
- a third internal pooling unit and a fourth internal pooling unit cascaded with the first internal convolution unit and connected in parallel;
- an internal fusion unit used to fuse image features output by the third internal pooling unit and the fourth internal pooling unit; and
- a first internal activation unit used to normalize an image feature output by the internal fusion unit (for example, normalize the image feature output by the internal fusion unit using a Sigmoid function).

Here, the first internal pooling unit is used to perform average pooling on the input image feature; the second internal pooling unit is used to perform maximum pooling on the input image feature; the first internal convolution unit may be a convolution unit implemented based on a depthwise convolution (DW) layer or may be a convolution unit implemented based on a depthwise separable convolution (DSC) layer; the third internal pooling unit is used to perform average pooling on the input image feature; and the fourth internal pooling unit is used to perform maximum pooling on the input image feature. Here, the DSC layer may be constructed by combining the DW layer with a pointwise convolution (PW) layer. In the actual application process, the first internal convolution unit can perform in-depth channel feature extraction on the input image feature, thereby improving the channel attention ability and feature expression ability. At the same time, the first internal convolution unit can reduce some unnecessary parameters in the neural network calculation process due to the weight sharing characteristic.

Figure 3E:
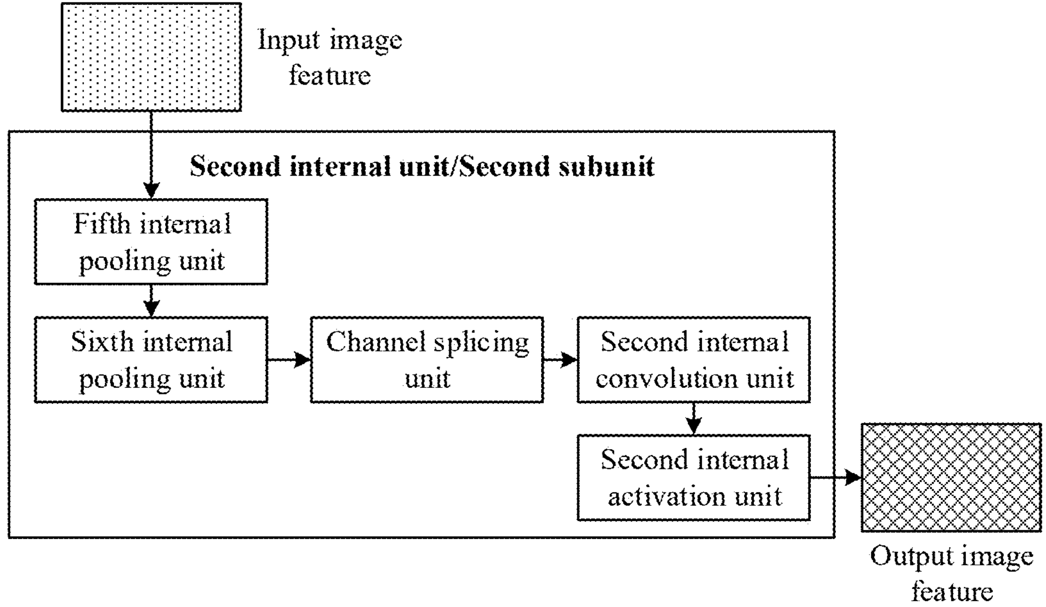
FIG. 3E is a structural schematic diagram of a second internal unit and a second subunit according to an embodiment of the present disclosure.

More specifically, referring to FIG. 3E, the second internal unit and the second subunit may include:

- a fifth internal pooling unit and a sixth internal pooling unit that are cascaded; and
- a channel splicing unit, a second internal convolution unit and a second internal activation unit cascaded with the sixth internal pooling unit and in a cascade structure.

Here, the fifth internal pooling unit is used to perform average pooling on the input image feature; the sixth internal pooling unit is used to perform maximum pooling on the input image feature; the channel splicing unit is used to splice the input image features according to channels; the second internal convolution unit may be a convolution unit based on a standard convolution network or may be directly implemented using CNN; and the second internal activation unit is used to normalize the image feature output by the second internal convolution unit (for example, normalize the image feature output by the second internal convolution unit using a Sigmoid function).

Figure 3F:
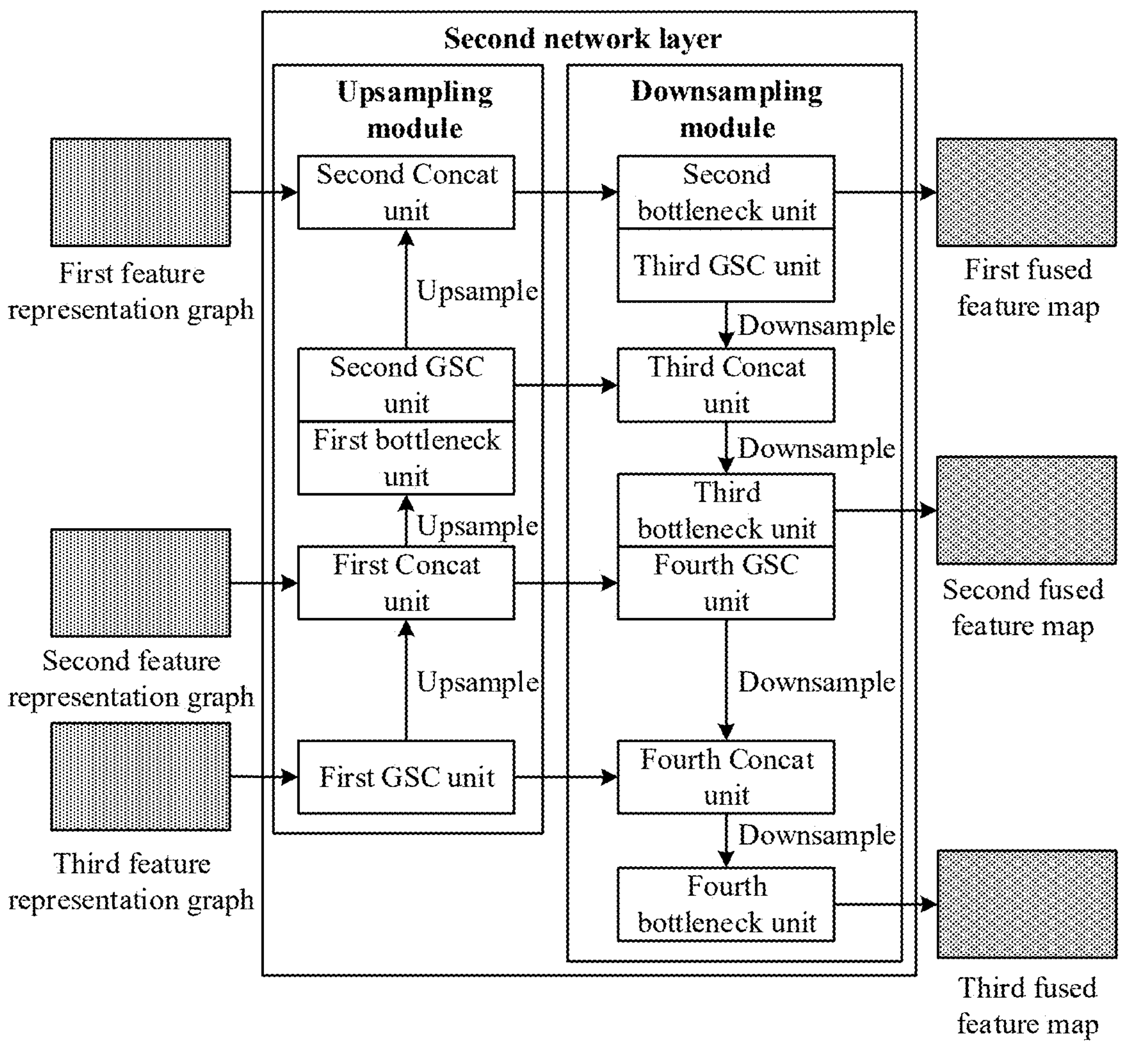
FIG. 3F is a structural schematic diagram of a second network layer according to an embodiment of the present disclosure.

Referring to FIG. 3F, by way of example, the second network layer may include an upsampling module and a downsampling module.

Here, the upsampling module may include a first ghost shuffle convolution (GSC) unit, a first tensor Concat unit, a first bottleneck unit, a second GSC unit and a second Concat unit that are cascaded. Here, the first GSC unit is used to perform convolution processing on the third feature representation graph; the first Concat unit is used to perform tensor concatenation on the second feature representation graph and the image feature output by the first GSC unit after upsampling to obtain an output image feature, and sequentially input the output image feature after upsampling into the first bottleneck unit and the second GSC unit for processing; and the second Concat unit is used to perform tensor concatenation on the first feature representation graph and the image feature output by the second GSC unit after upsampling to obtain an output image feature.

The downsampling module may include a second bottleneck unit, a third GSC unit, a third Concat unit, a third bottleneck unit, a fourth GSC unit, a fourth Concat unit and a fourth bottleneck unit that are cascaded. Here, the second bottleneck unit is used to process the image feature output by the second GSC unit to obtain a first fused feature map; the third GSC unit is used to perform convolution processing on the first fused feature map; the third Concat unit is used to perform tensor concatenation on the image feature output by the second GSC unit and the image feature output by the third GSC unit after downsampling to obtain an output image feature, and sequentially input the output image feature after downsampling to the third bottleneck unit and the fourth GSC unit for processing, where the image feature output by the third bottleneck unit is a second fused feature map; the fourth Concat unit is used to perform tensor concatenation on the image feature output by the first GSC unit and the image feature output by the fourth GSC unit after downsampling to obtain an output image feature; and the fourth bottleneck unit is used to process the image feature output by the fourth Concat unit after downsampling to obtain a third fused feature map.

Figure 3G:
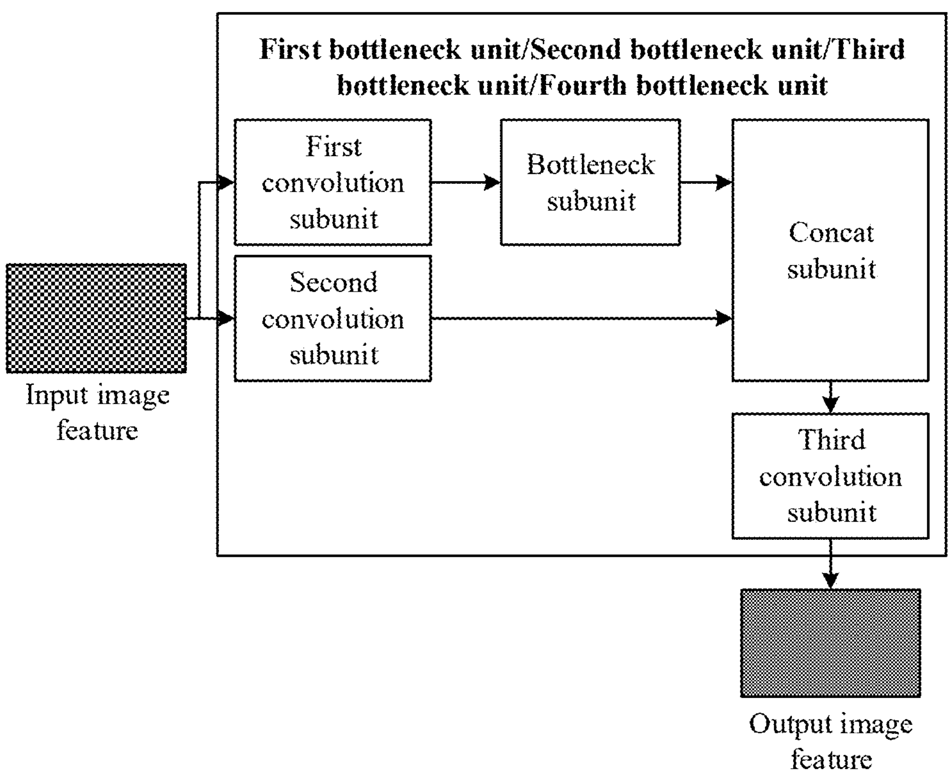
FIG. 3G is a structural schematic diagram of a first bottleneck unit, a second bottleneck unit, a third bottleneck unit and a fourth bottleneck unit according to an embodiment of the present disclosure.

In this example, the first bottleneck unit, the second bottleneck unit, the third bottleneck unit and the fourth bottleneck unit may have the same structure. More specifically, referring to FIG. 3G, the first bottleneck unit, the second bottleneck unit, the third bottleneck unit and the fourth bottleneck unit may include:

- a first convolution subunit and a bottleneck subunit that are cascaded, where the bottleneck subunit consists of a bottleneck layer (e.g., Bottleneck layer) and a Channel Split and Concatenate (CSP) layer;
- a second convolution subunit connected in parallel with the first convolution subunit and the bottleneck subunit in a cascade structure;
- a Concat subunit with image features output by the bottleneck subunit and the second convolution subunit as input; and
- a third convolution subunit cascaded with the Concat subunit.

Here, the first convolution subunit, the second convolution subunit and the third convolution subunit may be convolution units implemented based on a standard convolution network; the Bottleneck layer is used to reduce some unnecessary parameters in a neural network calculation process; and the CSP layer is used to perform operations such as Split, Concat and Shuffle on the input image feature.

Figure 3H:
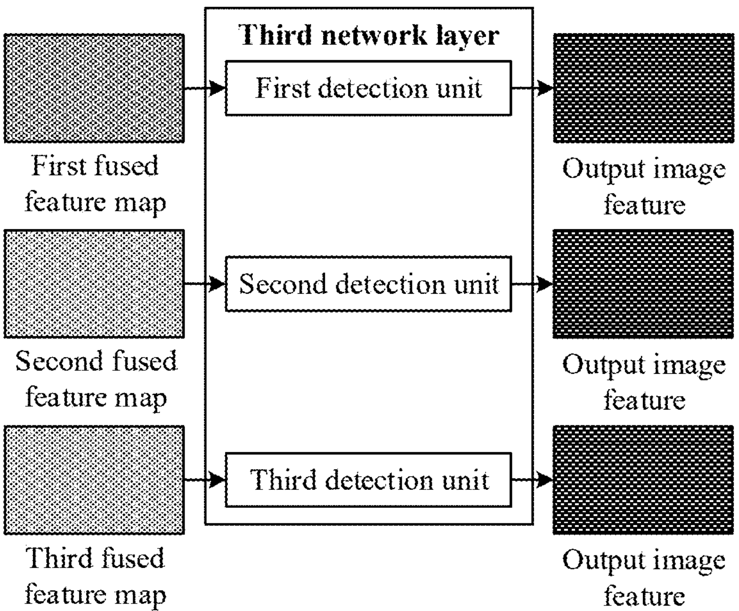
FIG. 3H is a structural schematic diagram of a third network layer according to an embodiment of the present disclosure.

Referring to FIG. 3H, by way of example, the third network layer may include a first detection unit for connecting to the second bottleneck unit, a second detection unit for connecting to the third bottleneck unit, and a third detection unit for connecting to the fourth bottleneck unit.

Here, the first detection unit, the second inspection unit and the third detection unit may be convolution units implemented based on the standard convolution network.

The defect detection result may be obtained based on the image features output by the first detection unit, the second detection unit and the third detection unit.

In the embodiment of the present disclosure, the defect detection network includes the first network layer, second network layer and third network layer. Since the first network layer is used to perform feature extraction on the yarn spindle image by combining the channel attention mechanism with the spatial attention mechanism to obtain K feature representation graphs in different scales, feature representation capabilities of the K feature representation graphs can be ensured. In this way, after using the second network layer to perform feature fusion based on the K feature representation graphs to obtain K fused feature graphs and using the third network layer to obtain the defect detection result based on the K fused feature graphs, reliability of the defect detection result can be improved, thereby further improving accuracy in recycling pallets.

Moreover, it should be noted that the defect detection network can be trained through the following processes in the embodiment of the present disclosure.

(1) A yarn spindle image sample and a data label corresponding to the yarn spindle image sample are obtained; where the data label is used to represent whether the broken filament, oil stain, yarn tripping, poor molding, paper tube damage or the like exists in the yarn spindle image.

(2) The yarn spindle image sample is input into an initial detection model to obtain an image feature output by the initial detection model.

(3) A defect prediction result is obtained based on the image feature output by the initial detection model.

(4) A loss value between the defect prediction result and the data label is calculated using a preset loss function; when the loss value does not meet a preset convergence condition, model parameters of the initial detection model are adjusted; when the loss value meets the preset convergence condition, the initial detection model is taken as the defect detection model.

Here, the preset loss function may be a Shape and Intersection over Union Loss (SIoU) function.

Further, in an embodiment of the present disclosure, the pallet diversion device includes a first diversion device and a second diversion device arranged on the main line of the assembly line, and branch lines of the assembly line include a first branch line and a second branch line. Based on this, in some optional implementations, the step S102 of "controlling the pallet diversion device to divert the pallet to be recycled from the main line of the assembly line to a branch line of the assembly line" may include the following steps.

Step S1021: The first diversion device is controlled to divert the first pallet to be recycled from the main line of the assembly line to the first branch line of the assembly line.

Here, the first diversion device may receive a pallet identifier of the first pallet to be recycled sent by the electronic device as a first target identifier.

When the N yarn spindle pallets included in the target pallet group pass through the first diversion device, the first diversion device may judge whether there is a pallet to be recycled with a pallet identifier matching the first target identifier among the N yarn spindle pallets. When there is a pallet to be recycled with a pallet identifier matching the first target identifier among the N yarn spindle pallets, the pallet to be recycled is confirmed as the first pallet to be recycled, and the first pallet to be recycled is diverted from the main line of the assembly line to the first branch line of the assembly line.

Step S1022: The second diversion device is controlled to divert the second pallet to be recycled from the main line of the assembly line to the second branch line of the assembly line.

Here, the second diversion device may receive a pallet identifier of the second pallet to be recycled sent by the electronic device as a second target identifier.

When other yarn spindle pallets than the first pallet to be recycled among the N yarn spindle pallets included in the target pallet group pass through the second diversion device, the second diversion device may judge whether there is a pallet to be recycled with a pallet identifier matching the second target identifier among the other yarn spindle pallets. When there is a pallet to be recycled with a pallet identifier matching the second target identifier among the other yarn spindle pallets, the pallet to be recycled is confirmed as the second pallet to be recycled, and the second pallet to be recycled is diverted from the main line of the assembly line to the second branch line of the assembly line.

Figure 4A:
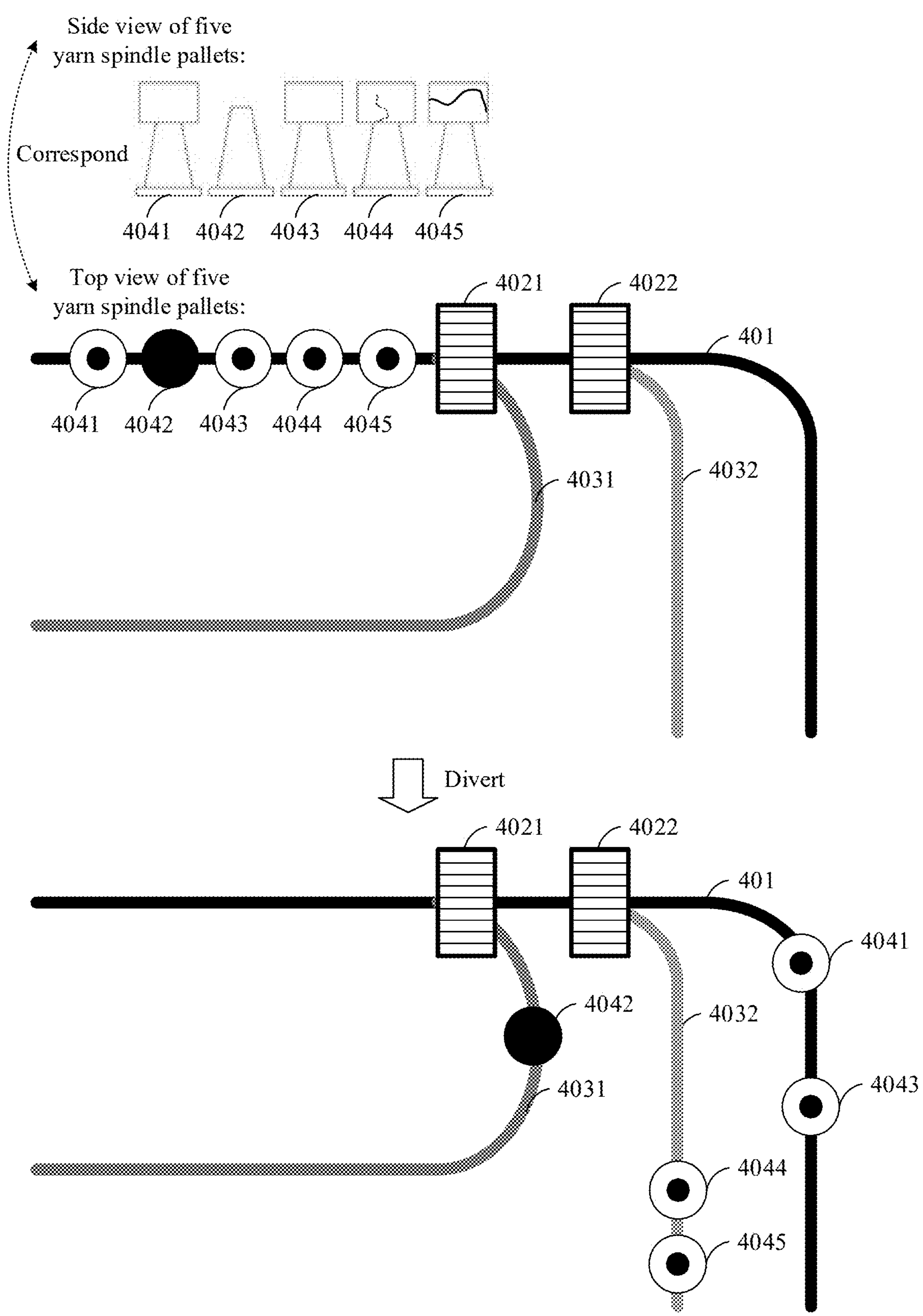
FIGS. 4A to 4E are example diagrams of a diversion process in the pallet recycling method according to an embodiment of the present disclosure.

Referring to FIG. 4A, by way of example, the pallet diversion device includes a first diversion device 4021 and a second diversion device 4022 arranged on a main line 401 of a assembly line, and branch lines of the assembly line include a first branch line 4031 and a second branch line 4032. The target pallet group includes five yarn spindle pallets (i.e., N=5): a first yarn spindle pallet 4041, a second yarn spindle pallet 4042, a third yarn spindle pallet 4043, a fourth yarn spindle pallet 4044, and a fifth yarn spindle pallet 4045. Here, the second yarn spindle pallet 4042 is the first pallet to be recycled, and the fourth yarn spindle pallet 4044 and the fifth yarn spindle pallet 4045 are the second pallets to be recycled.

Then, when the five yarn spindle pallets included in the target pallet group pass through the first diversion device 4021, the first diversion device 4021 may, after reading the pallet identifier of the second yarn spindle pallet 4042 through radio frequency identification (RFID), determine that the pallet identifier of the second yarn spindle pallet 4042 matches the first target identifier, confirm the second yarn spindle pallet 4042 as the first pallet to be recycled, and then divert the first pallet to be recycled from the main line 401 of the assembly line to the first branch line 4031 of the assembly line; when other yarn spindle pallets (i.e., the first yarn spindle pallet 4041, the third yarn spindle pallet 4043, the fourth yarn spindle pallet 4044 and the fifth yarn spindle pallet 4045) than the first pallet to be recycled (i.e., the second yarn spindle pallet 4042) among the five yarn spindle pallets included in the target pallet group pass through the second diversion device 4022, the second diversion device 4022 may, after reading the pallet identifiers of other yarn spindle pallets through RFID, determine that the pallet identifiers of the fourth yarn spindle pallet 4044 and the fifth yarn spindle pallet 4045 among the other yarn spindle pallets match the second target identifier, confirm the fourth yarn spindle pallet 4044 and the fifth yarn spindle pallet 4045 as the second pallets to be recycled, and then divert the second pallets to be recycled from the main line 401 of the assembly line to the second branch line 4032 of the assembly line.

Through the above steps included in step S102, the first pallet to be recycled and the second pallet to be recycled will be diverted to different branch lines for different processing, thereby ensuring that accuracy in recycling pallets is improved. For example, the first pallet to be recycled that is diverted to the first branch line may eventually be diverted to the pallet recycle location to form a new target pallet group and enter the main line source of the assembly line again; for another example, the second pallet to be recycled that is diverted to the second branch line may enter a re-inspection process to judge whether the yarn spindle to be packaged placed on the second pallet to be recycled is indeed a graded yarn spindle, thereby avoiding misjudgment.

As described above, in the embodiment of the present disclosure, the second pallet to be recycled that is diverted to the second branch line may enter the re-inspection process to judge whether the yarn spindle to be packaged placed on the second pallet to be recycled is indeed a graded yarn spindle, thereby avoiding misjudgment. In this case, in an embodiment of the present disclosure, the pallet diversion device may further include a third diversion device arranged on the second branch line, and the branch lines of the assembly line may further include a third branch line. Based on this, in some optional implementations, after step S1022, step S102 may further include one of the following steps.

Step S1023: The third diversion device is controlled to divert the second pallet to be recycled from the second branch line to a pallet recycle location when a re-inspection result of the second pallet to be recycled indicates that the yarn spindle to be packaged on the second pallet to be recycled is a graded yarn spindle.

Here, the purpose of re-inspecting the second pallet to be recycled is to judge whether the yarn spindle to be packaged placed on the second pallet to be recycled is indeed the graded yarn spindle, thereby avoiding misjudgment. For example, in some cases, the surface of a yarn spindle to be packaged placed on a yarn spindle pallet may have a cleanable stripe, but this yarn spindle pallet may be misjudged as the second pallet to be recycled when "determining that there is a pallet to be recycled in the target pallet group based on the grabbing result representation image". Moreover, in the embodiment of the present disclosure, the re-inspection process may be implemented using a machine vision method or may be performed manually, which is not limited in the embodiment of the present disclosure.

In an example, the re-inspection result may be recorded by scanning the pallet identifier. Specifically, when the second pallet to be recycled is re-inspected and it is determined that the yarn spindle to be packaged placed on the second pallet to be recycled is a graded yarn spindle, the pallet identifier of the second pallet to be recycled may be scanned as a third target identifier, and the third target identifier is sent to the electronic device for recording, and then the electronic device sends the third target identifier to the third diversion device. In this way, when the second pallet to be recycled passes through the third diversion device, the third diversion device may judge whether the pallet identifier of the second pallet to be recycled matches the third target identifier. When the pallet identifier of the second pallet to be recycled matches the third target identifier, it is determined that the re-inspection result of the second pallet to be recycled indicates that the yarn spindle to be packaged placed on the second pallet to be recycled is a graded yarn spindle, and the second pallet to be recycled is diverted from the second branch line to the pallet recycle location.

In another example, the re-inspection result may be indirectly recorded by removing the yarn spindle to be packaged. Specifically, when the second pallet to be recycled is re-inspected and it is determined that the yarn spindle to be packaged placed on the second pallet to be recycled is a graded yarn spindle, the yarn spindle to be packaged placed on the second pallet to be recycled may be removed from the second pallet to be recycled, so that the second pallet to be recycled becomes an empty second pallet to be recycled. Afterwards, the empty second pallet to be recycled will pass through an empty pallet detection device on the second branch line. When the empty pallet detection device detects that the second pallet to be recycled is empty, the pallet identifier of the empty second pallet to be recycled may be recorded as a fourth target identifier, and the fourth target identifier is sent to an electronic device for recording, and then the electronic device sends the fourth target identifier to the third diversion device. In this way, when the second pallet to be recycled passes through the third diversion device, the third diversion device may judge whether the pallet identifier of the second pallet to be recycled matches the fourth target identifier. When the pallet identifier of the second pallet to be recycled matches the fourth target identifier, it is determined that the re-inspection result of the second pallet to be recycled indicates that the yarn spindle to be packaged placed on the second pallet to be recycled is a graded yarn spindle, and the second pallet to be recycled is diverted from the second branch line to the pallet recycle location. Here, the empty pallet detection device may use the machine vision method to detect whether the second pallet to be recycled is empty.

Step S1024: The third diversion device is controlled to divert the second pallet to be recycled from the second branch line to the third branch line to flow back from the third branch line to the main line of the assembly line when the re-inspection result of the second pallet to be recycled indicates that the yarn spindle to be packaged on the second pallet to be recycled is a non-graded yarn spindle.

In an example, the re-inspection result is recorded by scanning the pallet identifier. Then, when the second pallet to be recycled passes through the third diversion device, the third diversion device may judge whether the pallet identifier of the second pallet to be recycled matches the third target identifier. When the pallet identifier of the second pallet to be recycled does not match the third target identifier, the third diversion device determines that the re-inspection result of the second pallet to be recycled indicates that the yarn spindle to be packaged placed on the second pallet to be recycled is a non-graded yarn spindle (for example, a yarn spindle product with grade AA), and diverts the second pallet to be recycled from the second branch line to the third branch line, to flow back from the third branch line to the main line of the assembly line. Then proceed to the next process, such as weighing, external inspection, bagging, palletizing, strapping, film wrapping, pasting shipping marks, etc.

In another example, the re-inspection result is indirectly recorded by removing the yarn spindle to be packaged. Then, when the second pallet to be recycled passes through the third diversion device, the third diversion device may judge whether the pallet identifier of the second pallet to be recycled matches the fourth target identifier. When the pallet identifier of the second pallet to be recycled does not match the fourth target identifier, the third diversion device determines that the re-inspection result of the second pallet to be recycled indicates that the yarn spindle to be packaged placed on the second pallet to be recycled is a non-graded yarn spindle (for example, a yarn spindle product with grade AA), and diverts the second pallet to be recycled from the second branch line to the third branch line, to flow back from the third branch line to the main line of the assembly line. Then proceed to the next process, such as weighing, external inspection, bagging, palletizing, strapping, film wrapping, pasting shipping marks, etc.

Figure 4B:
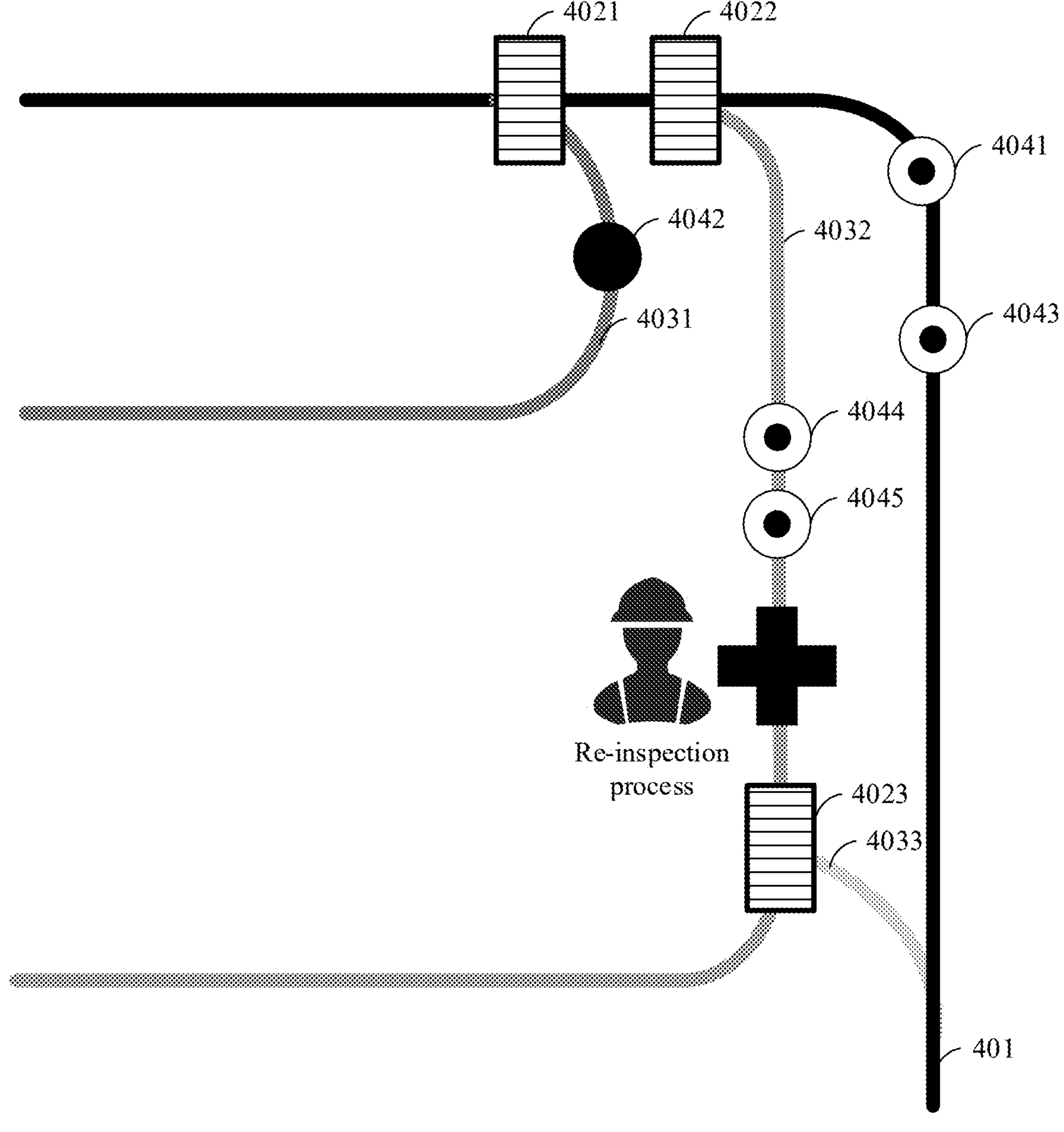

Continuing with the example provided in FIG. 4A and in combination with FIG. 4B, it is assumed that, in this example, a re-inspection result is recorded by scanning a pallet identifier, a re-inspection result of a second pallet 4044 to be recycled indicates that the yarn spindle to be packaged placed on the second pallet 4044 to be recycled is a graded yarn spindle, and a re-inspection result of a second pallet 4045 to be recycled indicates that the yarn spindle to be packaged placed on the second pallet 4045 to be recycled is a non-graded yarn spindle. Moreover, when the second pallet 4044 to be recycled is re-inspected and it is determined that the yarn spindle to be packaged placed on the second pallet 4044 to be recycled is a graded yarn spindle, the pallet identifier of the second pallet 4044 to be recycled has been scanned as a third target identifier, and the third target identifier is sent to an electronic device for recording, and then the electronic device sends the third target identifier to a third diversion device 4023.

Figure 4C:
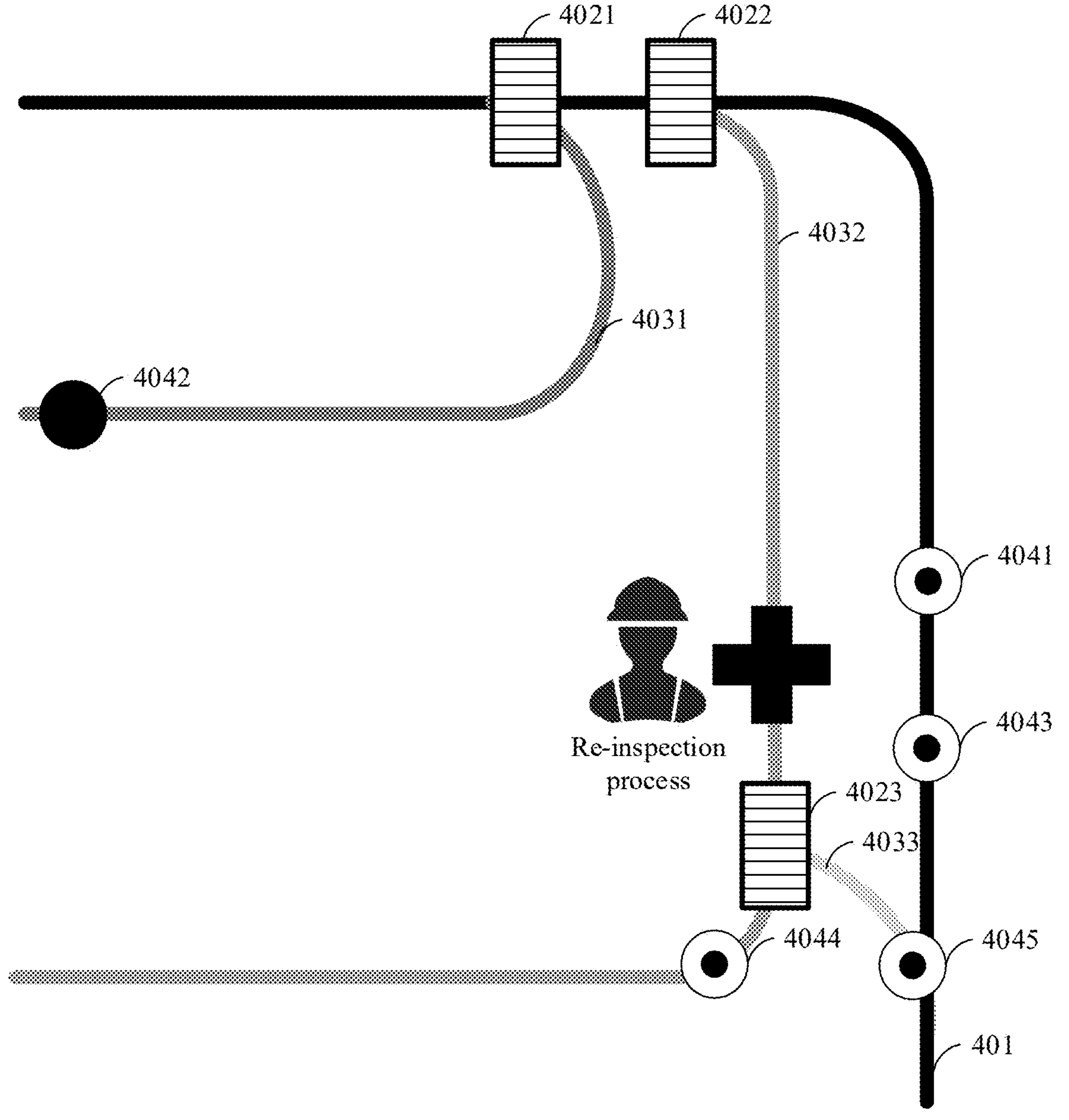

Then, referring to FIG. 4C, when the second pallet 4044 to be recycled passes through the third diversion device 4023, the third diversion device 4023 may, after reading the pallet identifier of the second pallet 4044 to be recycled through RFID, determine that the pallet identifier of the second pallet 4044 to be recycled matches the third target identifier to determine that the re-inspection result of the second pallet 4044 to be recycled indicates that the yarn spindle to be packaged placed on the second pallet 4044 to be recycled is a graded yarn spindle, and divert the second pallet 4044 to be recycled from the second branch line 4032 to the pallet recycle location; when the second pallet 4045 to be recycled passes through the third diversion device 4023, the third diversion device 4023 may, after reading a pallet identifier of the second pallet 4045 to be recycled through RFID, determine that the pallet identifier of the second pallet 4045 to be recycled does not match the third target identifier to determine that the re-inspection result of the second pallet 4045 to be recycled indicates that the yarn spindle to be packaged placed on the second pallet 4045 to be recycled is a non-graded yarn spindle, and divert the second pallet 4045 to be recycled from the second branch line 4032 to the third branch line 4033, to flow back from the third branch line 4033 to the main line 401 of the assembly line. Then proceed to the next process, such as weighing, external inspection, bagging, palletizing, strapping, film wrapping, pasting shipping marks, etc.

Figure 4D:
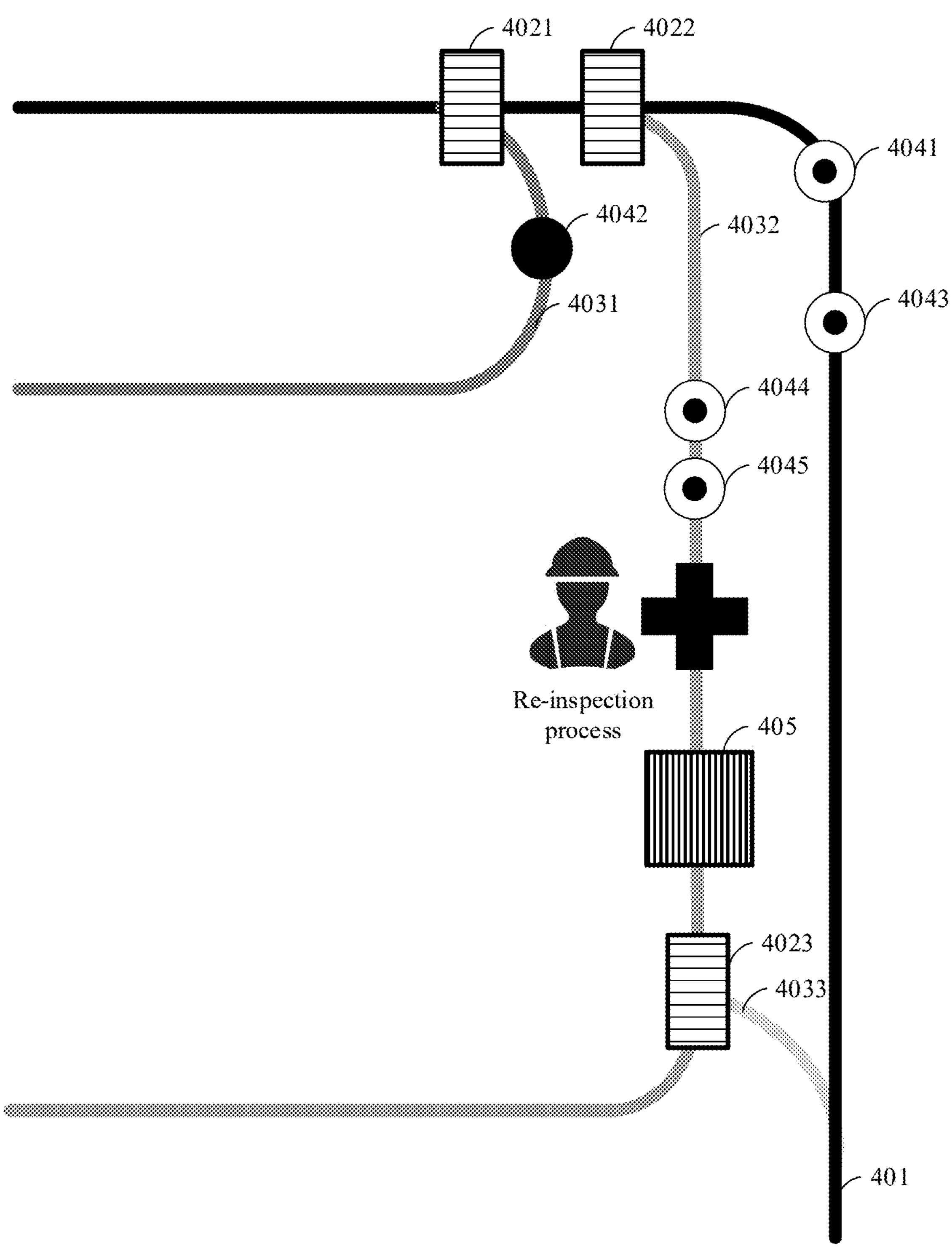

Continuing with the example provided in FIG. 4A and in combination with FIG. 4D, it is assumed that, in this example, the re-inspection result is indirectly recorded by removing the yarn spindle to be packaged, the re-inspection result of the second pallet 4044 to be recycled indicates that the yarn spindle to be packaged placed on the second pallet 4044 to be recycled is a graded yarn spindle, and the re-inspection result of the second pallet 4045 to be recycled indicates that the yarn spindle to be packaged placed on the second pallet 4045 to be recycled is a non-graded yarn spindle. Moreover, when the second pallet 4044 to be recycled is re-inspected and it is determined that the yarn spindle to be packaged placed on the second pallet 4044 to be recycled is a graded yarn spindle, the yarn spindle to be packaged placed on the second pallet 4044 to be recycled has been removed from the second pallet 4044 to be recycled, so that the second pallet 4044 to be recycled becomes an empty second pallet 4044 to be recycled. Afterwards, the empty second pallet 4044 to be recycled will pass through an empty pallet detection device 405 on the second branch line 4032. When the empty pallet detection device 405 detects that the second pallet 4044 to be recycled is empty, the pallet identifier of the empty second pallet 4044 to be recycled may be recorded as a fourth target identifier, and the fourth target identifier is sent to the electronic device for recording, and then the electronic device sends the fourth target identifier to the third diversion device 4023.

Figure 4E:
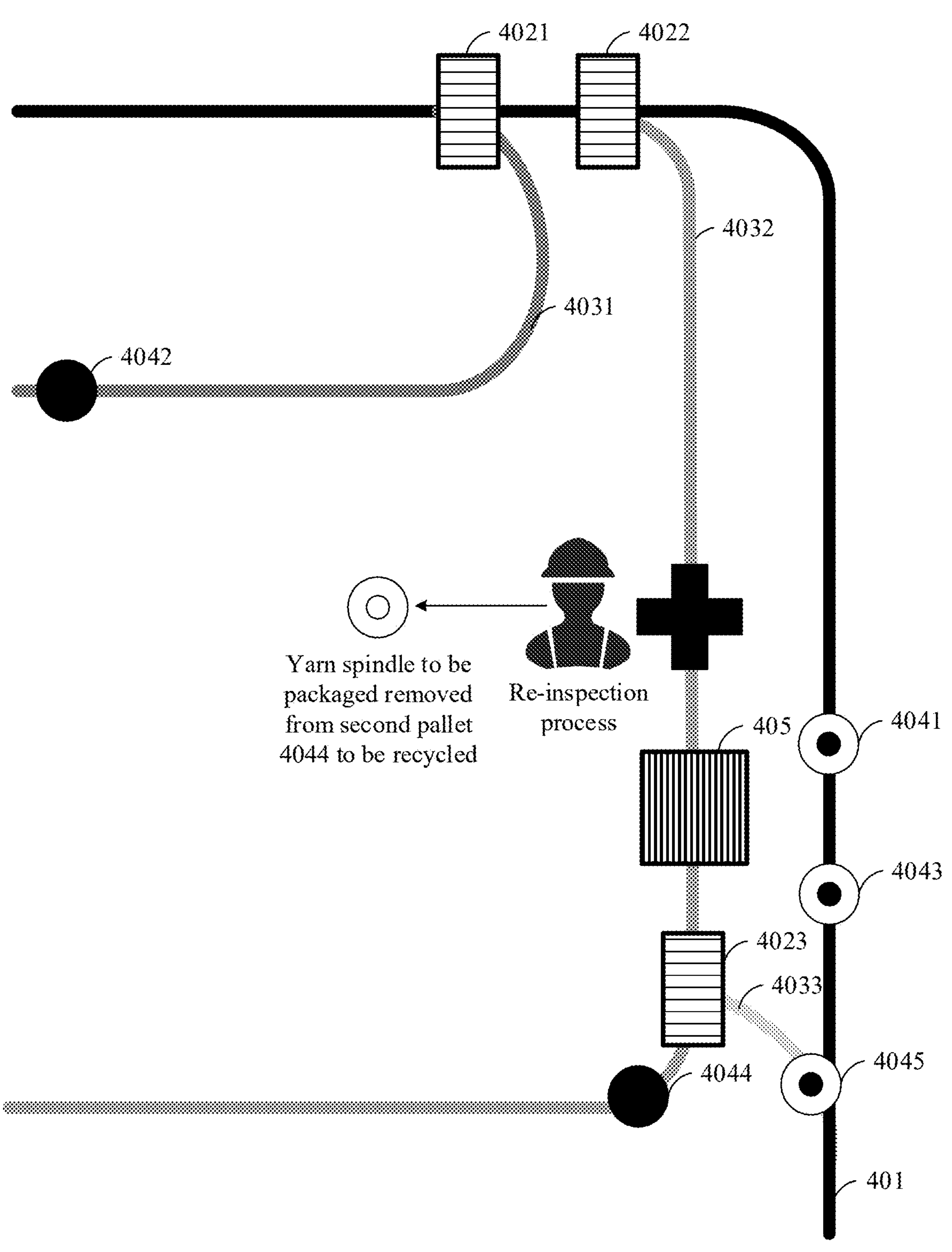

Then, referring to FIG. 4E, when the second pallet 4044 to be recycled passes through the third diversion device 4023, the third diversion device 4023 may, after reading the pallet identifier of the second pallet 4044 to be recycled through RFID, determine that the pallet identifier of the second pallet 4044 to be recycled matches the fourth target identifier to determine that the re-inspection result of the second pallet 4044 to be recycled indicates that the yarn spindle to be packaged placed on the second pallet 4044 to be recycled is a graded yarn spindle, and divert the second pallet 4044 to be recycled from the second branch line 4032 to the pallet recycle location; when the second pallet 4045 to be recycled passes through the third diversion device 4023, the third diversion device 4023 may, after reading the pallet identifier of the second pallet 4045 to be recycled through RFID, determine that the pallet identifier of the second pallet 4045 to be recycled does not match the fourth target identifier to determine that the re-inspection result of the second pallet 4045 to be recycled indicates that the yarn spindle to be packaged placed on the second pallet 4045 to be recycled is a non-graded yarn spindle, and divert the second pallet 4045 to be recycled from the second branch line 4032 to the third branch line 4033, to flow back from the third branch line 4033 to the main line 401 of the assembly line. Then proceed to the next process, such as weighing, external inspection, bagging, palletizing, strapping, film wrapping, pasting shipping marks, etc.

Through the above steps included in step S102, in the embodiment of the present disclosure, the second pallet to be recycled may be re-diverted after whether the yarn spindle to be packaged placed on the second pallet to be recycled is indeed a graded yarn spindle is further judged, to further ensure the accuracy in recycling pallets.

In order to better implement the above pallet recycling method, an embodiment of the present disclosure further provides a pallet recycling apparatus, applied to an electronic device included in a yarn spindle packaging system. The electronic device communicates with an image acquisition device and a pallet diversion device respectively. The electronic device may be a computer, a PLC, etc.; the image acquisition device may be an industrial camera; the pallet diversion device may be a pneumatic diverter, an electric diverter, a roller diverter, etc., which are not limited in the embodiments of the present disclosure.

Figure 5:
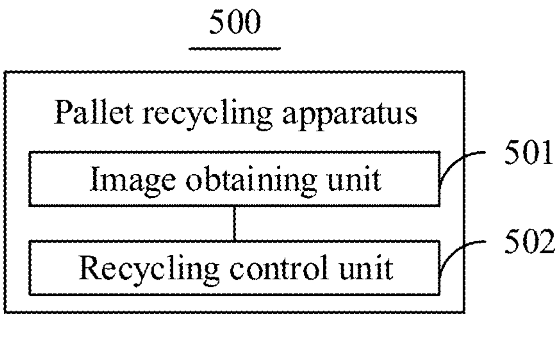
FIG. 5 is a schematic structural block diagram of a pallet recycling apparatus according to an embodiment of the present disclosure.

Hereinafter, a pallet recycling apparatus 500 according to an embodiment of the present disclosure will be described with reference to the structural schematic diagram shown in FIG. 5.

The pallet recycling apparatus 500 includes:

- an image obtaining unit 501 configured to, after a robot grabs M yarn spindles to be packaged from a yarn spindle trolley through N grippers, control the image acquisition device to shoot towards the N grippers to obtain a grabbing result representation image; where each of the N grippers is capable of grabbing one yarn spindle to be packaged, $N\geq 2$ and N is an integer, $0\leq M\leq N$ and M is an integer; and
- a recycling control unit 502 configured to, after the robot places the M yarn spindles to be packaged one by one on M yarn spindle pallets included in a target pallet group arranged on a main line of an assembly line, and when determining that there is a pallet to be recycled in the target pallet group based on the grabbing result representation image, control the pallet diversion device to divert the pallet to be recycled from the main line of the assembly line to a branch line of the assembly line to realize recycling of the pallet to be recycled; where the pallet to be recycled is an empty first pallet to be recycled or a second pallet to be recycled on which a yarn spindle to be packaged is initially evaluated as a graded yarn spindle.

In some optional implementations, the electronic device further communicates with the robot;

where the image obtaining unit 501 is configured to:

- control the N grippers to rotate relative to the image acquisition device;
- control the image acquisition device to shoot towards the N grippers to obtain Z images to be processed during rotation of the N grippers relative to the image acquisition device; where $Z\geq 2$ and Z is an integer, and the Z images to be processed correspond to different viewing angles of the N grippers; and
- obtain the grabbing result representation image based on the Z images to be processed.

In some optional implementations, the image obtaining unit 501 is configured to:

- intercept N single-view images from each of the Z images to be processed to obtain $N\times Z$ single-view images; where the N single-view images correspond to the N grippers one by one;
- splice Z single-view images corresponding to a same gripper among the $N\times Z$ single-view images to obtain N multi-view images; and
- obtain the grabbing result representation image based on the N multi-view images.

In some optional implementations, the grabbing result representation image includes N multi-view images corresponding to the N grippers one by one, and the target pallet group includes a total of N yarn spindle pallets corresponding to the N grippers one by one, to establish a one-to-one correspondence between the N yarn spindle pallets and the N multi-view images;

where the recycling control unit 502 is configured to:

- for each of the N multi-view images, when determining that there is no yarn spindle image for representing a yarn spindle to be packaged in the multi-view image, determine that there is a pallet to be recycled in the target pallet group, and take a yarn spindle pallet corresponding to the multi-view image among the N yarn spindle pallets as the first pallet to be recycled; and
- when determining that there is a yarn spindle image for representing a yarn spindle to be packaged in the multi-view image and determining that the yarn spindle image has a defect feature through a defect detection network, determine that there is a pallet to be recycled in the target pallet group, and take a yarn spindle pallet corresponding to the multi-view image among the N yarn spindle pallets as the second pallet to be recycled.

In some optional implementations, the defect detection network includes a first network layer, a second network layer and a third network layer;

- the first network layer is used to perform feature extraction on the yarn spindle image by combining a channel attention mechanism with a spatial attention mechanism to obtain K feature representation graphs in different scales; where $K\geq 2$ and K is an integer;

the second network layer is used to perform feature fusion based on the K feature representation graphs to obtain K fused feature graphs; where the K fused feature graphs correspond to the K feature representation graphs one by one; and the third network layer is used to obtain a defect detection result based on the K fused feature graphs; where the defect detection result is used to indicate whether the yarn spindle image has a defect feature.

In some optional implementations, the pallet diversion device includes a first diversion device and a second diversion device arranged on the main line of the assembly line, and branch lines of the assembly line include a first branch line and a second branch line;

where the recycling control unit 502 is configured to:

control the first diversion device to divert the first pallet to be recycled from the main line of the assembly line to the first branch line of the assembly line; and control the second diversion device to divert the second pallet to be recycled from the main line of the assembly line to the second branch line of the assembly line.

In some optional implementations, the pallet diversion device further includes a third diversion device arranged on the second branch line, and the branch lines of the assembly line further include a third branch line;

where the recycling control unit 502 is configured to:

control the third diversion device to divert the second pallet to be recycled from the second branch line to a pallet recycle location when a re-inspection result of the second pallet to be recycled indicates that the yarn spindle to be packaged on the second pallet to be recycled is a graded yarn spindle;

or, control the third diversion device to divert the second pallet to be recycled from the second branch line to the third branch line to flow back from the third branch line to the main line of the assembly line when the re-inspection result of the second pallet to be recycled indicates that the yarn spindle to be packaged on the second pallet to be recycled is a non-graded yarn spindle.

For the description of specific functions and examples of the units in the pallet recycling apparatus provided in the embodiment of the present disclosure, reference may be made to the relevant description of corresponding steps in the above-mentioned method embodiments, which are not repeated here.

In the technical solution of the present disclosure, the acquisition, storage and application of the user's personal information involved are in compliance with relevant laws and regulations, and do not violate public order and good customs.

Figure 6:
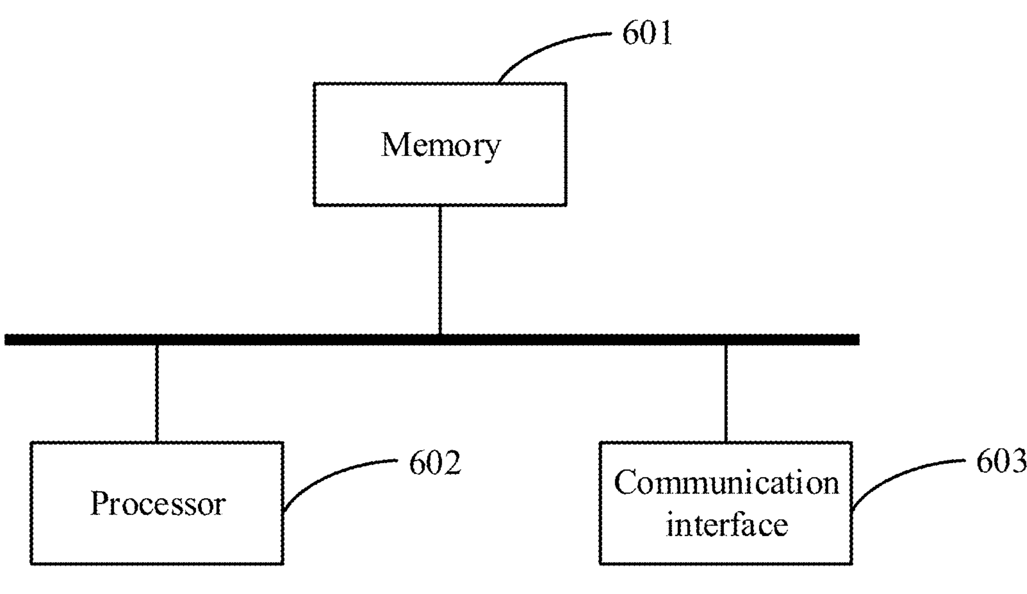
FIG. 6 is a schematic structural block diagram of an electronic device according to an embodiment of the present disclosure.

FIG. 6 is a structural block diagram of an electronic device according to an embodiment of the present disclosure. As shown in FIG. 6, the electronic device includes: a memory 601 and a processor 602, and the memory 601 stores a computer program that can run on the processor 602. There may be one or more memories 601 and processors 602. The memory 601 may store one or more computer programs, and the one or more computer programs cause the electronic device to perform the method provided in the above method embodiment, when executed by the electronic device. The electronic device may also include: a communication interface 603 configured to communicate with an external device for data interactive transmission.

If the memory 601, the processor 602 and the communication interface 603 are implemented independently, the memory 601, the processor 602 and the communication interface 603 may be connected to each other and complete communication with each other via a bus. The bus may be an industry standard architecture (ISA) bus, a peripheral component interconnect (PCI) bus, or an extended industry standard architecture (EISA) bus, etc. The bus may be divided into an address bus, a data bus, a control bus, etc. For ease of representation, the bus is represented by only one thick line in FIG. 6, but this thick line does not represent only one bus or only one type of bus.

Optionally, in a specific implementation, if the memory 601, the processor 602 and the communication interface 603 are integrated on one chip, the memory 601, the processor 602 and the communication interface 603 may communicate with each other via an internal interface.

It should be understood that the above processor may be a central processing unit (CPU) or other general-purpose processor, a digital signal processor (DSP), an application specific integrated circuit (ASIC), a field programmable gate array (FPGA) or other programmable logic device, a discrete gate or transistor logic device, a discrete hardware component, etc. The general-purpose processor may be a microprocessor or any conventional processor, etc. It is worth noting that the processor may be a processor that supports an advanced RISC machines (ARM) architecture.

Further, optionally, the above memory may include a read-only memory and a random access memory, and may also include a non-volatile random access memory. The memory may be a volatile memory or a non-volatile memory, or may include both a volatile memory and a non-volatile memory. Here, the non-volatile memory may include a read-only memory (ROM), a programmable ROM (PROM), an erasable PROM (EPROM), an electrically EPROM (EEPROM) or a flash memory. The volatile memory may include a random access memory (RAM), which acts as an external cache. By way of illustration and not limitation, many forms of RAMs are available, for example, a static RAM (SRAM), a dynamic random access memory (DRAM), a synchronous DRAM (SDRAM), a double data rate SDRAM (DDR SDRAM), an enhanced SDRAM (ESDRAM), a synchlink DRAM (SLDRAM) and a direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, a floppy disk, a hard disk, a magnetic tape), optical media (for example, a digital versatile disc (DVD)), or semiconductor media (for example, a solid state disk (SSD)), etc. It is worth noting that the computer readable storage medium mentioned in the present disclosure may be a non-volatile storage medium, in other words, may be a non-transitory storage medium.

Those having ordinary skill in the art can understand that all or some of steps for implementing the above embodiments may be completed by hardware, or may be completed by instructing related hardware through a program. The program may be stored in a computer readable storage medium. The above storage medium may be a read-only memory, a magnetic disk or an optical disk, etc.

In the description of embodiments of the present disclosure, the description with reference to the terms "an embodiment", "some embodiments", "example", "specific example" or "some examples", etc. means that specific features, structures, materials or characteristics described in conjunction with the embodiment or example are included in at least one embodiment or example of the present disclosure. Moreover, specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of embodiments of the present disclosure, the terms "first", "second" and "third" are only for purpose of description, and cannot be construed to indicate or imply the relative importance or implicitly point out the quantity of technical features indicated. Therefore, a feature defined with "first", "second" or "third" may explicitly or implicitly include one or more such features. In the description of embodiments of the present disclosure, "multiple" means two or more, unless otherwise specified.

The above descriptions are only example embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A pallet recycling method, applied to an electronic device comprised in a yarn spindle packaging system, wherein the electronic device communicates with an image acquisition device and a pallet diversion device respectively; and wherein the method comprises:

after a robot grabs M yarn spindles to be packaged from a yarn spindle trolley through N grippers, controlling the image acquisition device to shoot towards the N grippers to obtain a grabbing result representation image; wherein each of the N grippers is capable of grabbing one yarn spindle to be packaged, $N \geq 2$ and N is an integer, $0 \leq M \leq N$ and M is an integer; wherein the grabbing result representation image comprises N multi-view images corresponding to the N grippers one by one, and the target pallet group comprises a total of N yarn spindle pallets corresponding to the N grippers one by one, to establish a one-to-one correspondence between the N yarn spindle pallets and the N multi-view images;

after the robot places the M yarn spindles to be packaged one by one on M yarn spindle pallets comprised in a target pallet group arranged on a main line of an assembly line, determining that there is a pallet to be recycled in the target pallet group based on the grabbing result representation image, by:

for each of the N multi-view images, in a case of it is determined that there is no yarn spindle image for representing a yarn spindle to be packaged in the multi-view image, determining that there is a pallet to be recycled in the target pallet group, and taking a yarn spindle pallet corresponding to the multi-view image among the N yarn spindle pallets as the first pallet to be recycled; and in a case of it is determined that there is a yarn spindle image for representing a yarn spindle to be packaged in the multi-view image and determining that the yarn spindle image has a defect feature through a defect detection network, determining that there is a pallet to be recycled in the target pallet group, and taking a yarn spindle pallet corresponding to the multi-view image among the N yarn spindle pallets as the second pallet to be recycled; and controlling the pallet diversion device to divert the pallet to be recycled from the main line of the assembly line to a branch line of the assembly line to realize recycling of the pallet to be recycled; wherein the pallet to be recycled is an empty first pallet to be recycled or a second pallet to be recycled on which a yarn spindle to be packaged is initially evaluated as a graded yarn spindle.

2. The method of claim 1, wherein the electronic device further communicates with the robot;

wherein the controlling the image acquisition device to shoot towards the N grippers to obtain a grabbing result representation image, comprises:

controlling the N grippers to rotate relative to the image acquisition device;

controlling the image acquisition device to shoot towards the N grippers to obtain Z images to be processed during rotation of the N grippers relative to the image acquisition device; wherein $Z \geq 2$ and Z is an integer, and the Z images to be processed correspond to different viewing angles of the N grippers; and obtaining the grabbing result representation image based on the Z images to be processed.

3. The method of claim 2, wherein the obtaining the grabbing result representation image based on the Z images to be processed, comprises:

intercepting N single-view images from each of the Z images to be processed to obtain $N \times Z$ single-view images; wherein the N single-view images correspond to the N grippers one by one;

splicing Z single-view images corresponding to a same gripper among the $N \times Z$ single-view images to obtain the N multi-view images; and obtaining the grabbing result representation image based on the N multi-view images.

4. The method of claim 1, wherein the defect detection network comprises a first network layer, a second network layer and a third network layer;

the first network layer is used to combine a channel attention mechanism with a spatial attention mechanism to perform feature extraction on the yarn spindle image to obtain K feature representation maps in different scales; wherein K≥2 and K is an integer;

the second network layer is used to perform feature fusion based on the K feature representation maps to obtain K fused feature graphs; wherein the K fused feature graphs correspond to the K feature representation maps one by one; and the third network layer is used to obtain a defect detection result based on the K fused feature graphs; wherein the defect detection result is used to indicate whether the yarn spindle image has a defect feature.

5. The method of claim 1, wherein the pallet diversion device comprises a first diversion device and a second diversion device arranged on the main line of the assembly line, and branch lines of the assembly line comprise a first branch line and a second branch line;

wherein the controlling the pallet diversion device to divert the pallet to be recycled from the main line of the assembly line to a branch line of the assembly line, comprises:

controlling the first diversion device to divert the first pallet to be recycled from the main line of the assembly line to the first branch line of the assembly line; and controlling the second diversion device to divert the second pallet to be recycled from the main line of the assembly line to the second branch line of the assembly line.

6. The method of claim 5, wherein the pallet diversion device further comprises a third diversion device arranged on the second branch line, and the branch lines of the assembly line further comprise a third branch line;

wherein the controlling the pallet diversion device to divert the pallet to be recycled from the main line of the assembly line to a branch line of the assembly line, further comprises:

controlling the third diversion device to divert the second pallet to be recycled from the second branch line to a pallet recycle location in a case where a re-inspection result of the second pallet to be recycled indicates that the yarn spindle to be packaged on the second pallet to be recycled is a graded yarn spindle;

or, controlling the third diversion device to divert the second pallet to be recycled from the second branch line to the third branch line to flow back from the third branch line to the main line of the assembly line in a case where the re-inspection result of the second pallet to be recycled indicates that the yarn spindle to be packaged on the second pallet to be recycled is a non-graded yarn spindle.

7. A non-transitory computer-readable storage medium storing a computer instruction thereon, wherein the computer instruction is used to cause a computer to execute the method of claim 1.

8. An electronic device comprised in a yarn spindle packaging system, wherein the electronic device communicates with an image acquisition device and a pallet diversion device respectively, comprising:

at least one processor; and a memory connected in communication with the at least one processor;

wherein the memory stores an instruction executable by the at least one processor, and the instruction, when executed by the at least one processor, enables the at least one processor to execute:

after a robot grabs M yarn spindles to be packaged from a yarn spindle trolley through N grippers, controlling the image acquisition device to shoot towards the N grippers to obtain a grabbing result representation image; wherein each of the N grippers is capable of grabbing one yarn spindle to be packaged, N≥2 and N is an integer, 0≤M≤N and M is an integer; wherein the grabbing result representation image comprises N multi-view images corresponding to the N grippers one by one, and the target pallet group comprises a total of N yarn spindle pallets corresponding to the N grippers one by one, to establish a one-to-one correspondence between the N yarn spindle pallets and the N multi-view images;

after the robot places the M yarn spindles to be packaged one by one on M yarn spindle pallets comprised in a target pallet group arranged on a main line of an assembly line, and when determining that there is a pallet to be recycled in the target pallet group based on the grabbing result representation image, by:

for each of the N multi-view images, in a case of it is determined that there is no yarn spindle image for representing a yarn spindle to be packaged in the multi-view image, determining that there is a pallet to be recycled in the target pallet group, and taking a yarn spindle pallet corresponding to the multi-view image among the N yarn spindle pallets as the first pallet to be recycled; and in a case of it is determined that there is a yarn spindle image for representing a yarn spindle to be packaged in the multi-view image and determining that the yarn spindle image has a defect feature through a defect detection network, determining that there is a pallet to be recycled in the target pallet group, and taking a yarn spindle pallet corresponding to the multi-view image among the N yarn spindle pallets as the second pallet to be recycled; and controlling the pallet diversion device to divert the pallet to be recycled from the main line of the assembly line to a branch line of the assembly line to realize recycling of the pallet to be recycled; wherein the pallet to be recycled is an empty first pallet to be recycled or a second pallet to be recycled on which a yarn spindle to be packaged is initially evaluated as a graded yarn spindle.

9. The electronic device of claim 8, wherein the electronic device further communicates with the robot;

wherein the controlling the image acquisition device to shoot towards the N grippers to obtain a grabbing result representation image, comprises:

controlling the N grippers to rotate relative to the image acquisition device;

controlling the image acquisition device to shoot towards the N grippers to obtain Z images to be processed during rotation of the N grippers relative to the image acquisition device; wherein Z≥2 and Z is an integer, and the Z images to be processed correspond to different viewing angles of the N grippers; and obtaining the grabbing result representation image based on the Z images to be processed.

10. The electronic device of claim 9, wherein the obtaining the grabbing result representation image based on the Z images to be processed, comprises:

intercepting N single-view images from each of the Z images to be processed to obtain N×Z single-view images; wherein the N single-view images correspond to the N grippers one by one;

splicing Z single-view images corresponding to a same gripper among the N×Z single-view images to obtain the N multi-view images; and obtaining the grabbing result representation image based on the N multi-view images.

11. The electronic device of claim 8, wherein the defect detection network comprises a first network layer, a second network layer and a third network layer;

the first network layer is used to combine a channel attention mechanism with a spatial attention mechanism to perform feature extraction on the yarn spindle image to obtain K feature representation maps in different scales; wherein K≥2 and K is an integer;

the second network layer is used to perform feature fusion based on the K feature representation maps to obtain K fused feature graphs; wherein the K fused feature graphs correspond to the K feature representation maps one by one; and the third network layer is used to obtain a defect detection result based on the K fused feature graphs; wherein the defect detection result is used to indicate whether the yarn spindle image has a defect feature.

12. The electronic device of claim 8, wherein the pallet diversion device comprises a first diversion device and a second diversion device arranged on the main line of the assembly line, and branch lines of the assembly line comprise a first branch line and a second branch line;

wherein the controlling the pallet diversion device to divert the pallet to be recycled from the main line of the assembly line to a branch line of the assembly line, comprises:

controlling the first diversion device to divert the first pallet to be recycled from the main line of the assembly line to the first branch line of the assembly line; and controlling the second diversion device to divert the second pallet to be recycled from the main line of the assembly line to the second branch line of the assembly line.

13. The electronic device of claim 12, wherein the pallet diversion device further comprises a third diversion device arranged on the second branch line, and the branch lines of the assembly line further comprise a third branch line;

wherein the controlling the pallet diversion device to divert the pallet to be recycled from the main line of the assembly line to a branch line of the assembly line, further comprises:

controlling the third diversion device to divert the second pallet to be recycled from the second branch line to a pallet recycle location in a case where a re-inspection result of the second pallet to be recycled indicates that the yarn spindle to be packaged on the second pallet to be recycled is a graded yarn spindle;

or, controlling the third diversion device to divert the second pallet to be recycled from the second branch line to the third branch line to flow back from the third branch line to the main line of the assembly line in a case where the re-inspection result of the second pallet to be recycled indicates that the yarn spindle to be packaged on the second pallet to be recycled is a non-graded yarn spindle.

* * * * *